(12) United States Patent
Kim et al.

(10) Patent No.: US 7,171,240 B2
(45) Date of Patent: *Jan. 30, 2007

(54) MOBILE COMMUNICATION APPARATUS WITH MULTIPLE TRANSMISSION AND RECEPTION ANTENNAS AND MOBILE COMMUNICATION METHOD THEREFOR

(75) Inventors: Sung-jin Kim, Suwon (KR); Hyeon-woo Lee, Suwon (KR); Ki-ho Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 523 days.

This patent is subject to a terminal disclaimer.

(21) Appl. No.: 10/329,952

(22) Filed: Dec. 27, 2002

(65) Prior Publication Data

US 2003/0134605 A1    Jul. 17, 2003

(30) Foreign Application Priority Data

Dec. 29, 2001   (KR) .............................. 2001-88234

(51) Int. Cl.
*H04B 1/38* (2006.01)

(52) U.S. Cl. ................ 455/561; 455/69; 455/422.1; 455/277.1; 375/343

(58) Field of Classification Search ............. 455/422.1, 455/561, 562.1, 550.1, 67.11, 101, 272, 277.1, 455/69, 296, 517; 370/310; 375/343
See application file for complete search history.

(56) References Cited

U.S. PATENT DOCUMENTS 5,828,658 A * 10/1998 Ottersten et al. ........... 370/310

6,671,313 B1 * 12/2003 Rached et al. .............. 375/224

(Continued)

FOREIGN PATENT DOCUMENTS

| KR | 2003-0033601 | 5/2003 |
|----|--------------|--------|
| WO | 00/72465 | 11/2000 |

OTHER PUBLICATIONS

Siemens, "Description of the Eigenbeamformer Concept and Performance Evaluation", Feb. 27, 2001, Tdoc R1-01-0203, XP-002224882, pp. 1-9, figures 1-2.*

(Continued)

*Primary Examiner*—Lana Le
(74) *Attorney, Agent, or Firm*—Lee & Morse, P.C.

(57) ABSTRACT

A mobile communication apparatus with multiple transmission and reception antennas and a mobile communication method therefore including a base station that restores long-term and short-term information from a received feedback signal, spatially processes dedicated physical channel (DPCH) signals using basis information generated from the restored long-term and short-term information, and transmits the results of adding pilot channel (PICH) signals to the spatially processed results, to the base station, and a mobile station that determines a first characteristic corresponding to the channel downlink characteristic for each of the transmission and reception antennas using the PICH signals transmitted from the base station, determines the long-term and short-term information based on the first characteristic, converts the determined long-term and short-term information to a feedback signal, and transmits the feedback signal to the base station. The long-term information includes effective long-term eigenvectors and eigenvalues, and the short-term information includes effective short-term eigenvectors and eigenvalues.

34 Claims, 17 Drawing Sheets

U.S. PATENT DOCUMENTS

| | | | |
|---|---|---|---|
| 6,904,107 B1* | 6/2005 | Rached et al. | 375/343 |
| 6,985,636 B1* | 1/2006 | Semenchenko | 382/266 |
| 2002/0009156 A1 | 1/2002 | Hottinen et al. | |
| 2003/0060236 A1* | 3/2003 | Kim et al. | 455/562 |
| 2003/0068983 A1* | 4/2003 | Kim et al. | 455/561 |
| 2003/0220103 A1* | 11/2003 | Kim et al. | 455/422.1 |
| 2004/0042427 A1* | 3/2004 | Hottinen | 370/310 |
| 2004/0142714 A1* | 7/2004 | Viswanath et al. | 455/517 |
| 2005/0153659 A1* | 7/2005 | Lee et al. | 455/67.13 |

OTHER PUBLICATIONS

Siemens, Advanced Closed Loop Tx Diversity concept (eigenbeamformer), Jul. 4, 2000, 3GPP TSG RAN WG 1, XX, XX, Meeting #14, XP002169992, pp. 1-12.*

Sep. 2002, UMTS (Universal Mobile Telecommunications System), 3GPP—TS 25.214 V5.2 DRAFT pp. 43-51.

1996, Golub, G, and G. Van. Loan, Matrix Computations, "The Unsymmeteric Eigenvalue Problem" Johns Hopkins University Press, London, pp. 208-211.

1996, Bergmans, Jan W.M., Digital Baseband Transmission and Recording, "Optimum distribution Of transmit power across frequency" [Appendix 3B], Kluwer Academic Press, Boston, p. 142.

Oct. 1997, Goldsmith, Andrea J., et al, "Veriable-Rate Variable-Power MQAM for Fading Channels" IEEE Transactions on Communications, vol. 45, No. 10 pp. 1218-1230.

* cited by examiner

MOBILE COMMUNICATION APPARATUS WITH MULTIPLE TRANSMISSION AND RECEPTION ANTENNAS AND MOBILE COMMUNICATION METHOD THEREFOR

BACKGROUND OF THE INVENTION

1. Field of the Invention

The present invention relates to the field of mobile communications. More particularly, the present invention relates to a mobile communication apparatus with multiple transmission and reception antennas, and a mobile communication method therefor, which is able to minimize the effects of fading, interference, and noise.

2. Description of the Related Art

Next-generation mobile communication systems require high-speed data transmission. More particularly, the next-generation systems require data transmission that is faster than the data transmission in mobile communication systems for personal communication service. As a wireless communication standard, Europe and Japan have adopted the wideband code division multiple access (W-CDMA) scheme, and North America has adopted the CDMA-2000 scheme.

Conventionally, a mobile communication system is commonly constructed of a base station and a plurality of mobile stations communicating with each other via the base station. High-speed data transmission in a mobile communication system can be achieved by minimizing user co-interference and signal loss, such as fading, affected by channel characteristics. Diversity techniques have been applied to prevent unstable communications due to fading. One such technique, a space diversity technique, uses multiple antennas.

Use of multiple antennas is considered necessary for future mobile communication systems as it is able to minimize user co-interference. A multiple transmission antenna system used to increase the capacity of a transmitter, which employs a diversity technique using multiple antennas to counteract signal fading, requires wide bandwidth for transmission due to a characteristic of next generation mobile communications.

For high-speed data transmission, it is essential to solve the problem of signal fading, which is the most significant channel characteristic affecting the performance of common mobile communication systems. Signal fading is significant because fading may reduce the amplitude of a received signal to tens of dB or even a few dB. Many kinds of diversity techniques are applied to overcome fading. A common CDMA technique utilizes a Rake receiver, which receives multiple path signals using the delay spread of a channel and corresponds to a reception diversity technique. However, this reception diversity technique is not effective when the delay spread is small.

Doppler spread channels require a time diversity technique using interleaving and coding techniques. However, a time diversity technique cannot be applied to a low-speed Doppler channel. An interior channel with a small delay spread and a pedestrian channel, which is a typical example of a low-speed Doppler channel, require a space diversity technique to counteract fading. The space diversity technique uses two or more antennas to overcome signal attenuation due to fading during transmission by switching antennas. Space diversity is classified into reception antenna diversity requiring reception antennas and transmission antenna diversity requiring transmission antennas. It is impractical in terms of cost and space utilization to adopt reception antenna diversity at individual mobile stations. Accordingly, transmission antenna diversity is adopted at the base station.

Transmission antenna diversity is categorized into closed-loop transmission diversity, where mobile stations feed downlink channel information back to the base station, and open-loop transmission diversity, where no feedback occurs from mobile stations to the base station. According to a transmission diversity approach, a mobile station determines the magnitude and phase on each channel to find optimal weight values. For this determination of the magnitude and phase on the channel, the base station transmits a pilot signal through each antenna to the mobile station. Then, the mobile station determines the magnitude and phase on the channel from each pilot signal and finds optimal weight values based on the magnitude and phase on the channel.

In transmission antenna diversity, diversity effects and signal-to-noise ratio improve as the number of antennas increases. However, the improvement of diversity efficiency decreases as the number of antennas (or signal transmission paths) used at the base station, i.e., the degree of diversity, increases. Therefore, continuing to increase the number of antennas beyond a certain point merely to achieve an extremely high diversity effect would be costly and impractical. However, increasing the number of antennas used in the base station to minimize the power of interference signals and to maximize the internal signal-to-noise ratio is an effective and quite practical technique.

A transmission adaptive antenna array system that provides diversity effects as well as beamforming effects to protect an internal signal from interference and noise is called a "downlink beamforming system." Particularly, a system that utilizes feedback information as in transmission diversity is called a "closed loop downlink beamforming system." Closed downlink beamforming systems that use information fed back from mobile stations to the base station require a sufficiently wide feedback channel bandwidth. If the feedback channel bandwidth is not sufficiently wide, communication performance degrades due to poor adaptability to channel information variations.

The European IMT-2000 standardization association has adopted transmission antenna array (TxAA) modes 1 and 2, which are closed loop transmission diversity schemes for two antennas, in the 3 GPP (Generation Partnership Project) R (Release) 99 version. TxAA mode 1, suggested by Nokia, feeds back only a phase variation between two antennas, whereas TxAA mode 2, suggested by Motorola, feeds back the gains as well as phases of two antennas. TxAA modes 1 and 2 are disclosed in the specification for the UMTS (Universal Mobile Telecommunications System) by the 3 GPP.

TxAA mode 1 or 2 for closed loop transmission diversity uses an adaptive antenna array and applies different complex number weights to each antenna of the adaptive transmission antenna array. The weights applied to the adaptive antenna array are associated with transmission channels and thus are expressed as, for example, w=h*. Here, w is a transmission antenna array weight vector, and h is a transmission array channel vector. Hereinafter, bold symbols indicate vectors and matrices and non-bold symbols indicate scalars.

In general, in a mobile communications system using a frequency division duplex (FDD) technique, transmission and reception channels have different characteristics, so there is need to feed back transmission channel information by the base station to identify the characteristic of a transmission channel h. According to TxAA mode 1 or 2, a mobile station calculates weight information w to be obtained from the channel information h and feeds the calculated weigh information back to the base station.

TxAA mode 1 quantizes only the phase component of the weight information w, $\theta_2-\theta_1$, into two bits and feeds back the result of the quantization. The weight information w is expressed as $w=[|w_1|\exp(j\theta_1), |w_2|\exp(j\theta_2)]$, where $w_1$ and $w_2$ are scalars. Here, the phase accuracy is $\pi/2$, and the maximum quantization error is $\pi/4$. A refined mode of updating only one of two bits at every time slot is applied to increase feedback efficiency. As an example, possible combinations of two bits include {b(2k), b(2k−1)} and {b(2k), b(2k+1)}, where b indicates a bit fed back during every consecutive time slot.

TxAA mode 2 feeds back both the constituents, the phase and gain, of the weight information w. The phase of the weight information is fed back as three (3) bits, and the gain of the weight information is fed back as one (1) bit. Therefore, the phase accuracy is $\pi/4$, and the maximum quantization error is $\pi/8$. A progressive refined mode of updating only one of four bits at every time point is applied to increase feedback efficiency. This progressive refine mode provides no prescription, unlike the refine mode having the prescription, that each bit should be an orthogonal basis value.

The above-described TxAA modes 1 and 2 have the following problems when the number of antennas and space-time channel characteristics vary.

First, when the number of antennas increases, the quantity of weights for each antenna that should be fed back also increases, and thus communication performance may degrade depending on the migration speed of a mobile station. With increasing migration speed of a mobile station, space-time channel variations become significant on a common fading channel. In this case, the feedback speed of channel information should be increased. For this reason, if the feedback speed of channel information is limited, communication performance may degrade due to an increase in the amount of feedback information with increasing number of antennas.

Second, when antennas are not spaced sufficiently far apart, the correlation between channels for each antenna increases. This increased channel-to-channel correlation reduces the quantity of information carried in a channel matrix. Use of an effective feedback scheme can prevent communication performance degradation occurring with a mobile station migrating at a rapid speed, even with the increasing number of antennas. However, because TxAA modes 1 and 2 are defined under the assumption that space-time channels for two antennas are independent, efficiency is not ensured when the number of antennas and space-time channel characteristics vary. In addition, TxAA modes 1 and 2 have not been applied for circumstances using more than two antennas.

SUMMARY OF THE INVENTION

In an effort to solve the above-described problems, it is a feature of an embodiment of the present invention to provide a mobile communication apparatus with multiple transmission and reception antennas, in which long-term information and short-term information reflecting the downlink characteristic of spatial channels for each of the transmission and reception antennas of the base station and mobile stations, which have multiple transmission and reception antennas, respectively, are fed back from a mobile station to a base station to minimize the effects of interference and noise and to maximize data transmission throughput, thereby minimizing fading effects.

It is another feature of an embodiment of the present invention to provide a mobile communication method performed in the above mobile communication apparatus with the multiple transmission and reception antennas.

According to one aspect of the present invention, there is provided a mobile communication apparatus with multiple transmission and reception antennas, the apparatus including a base station and a mobile station. The base station includes at least one transmission antenna and restores long-term information and short-term information from a feedback signal received from the mobile station, spatially processes dedicated physical channel (DPCH) signals using basis information generated from the restored long-term information and short-term information, and transmits the results of adding pilot channel (PICH) signals to the spatially processed results to the mobile station. The mobile station includes at least one reception antenna and determines a first characteristic corresponding to the channel downlink characteristic for each of the transmission and reception antennas from the PICH signals transmitted from the base station, determines the long-term information and short-term information reflecting the first characteristic, converts the determined long-term information and short-term information to the feedback signal, and transmits the feedback signal to the base station. Here, the long-term information includes effective long-term eigenvectors and effective long-term eigenvalues, and the short-term information includes effective short-term eigenvectors and effective short-term eigenvalues.

According to another aspect of the present invention, there is provided a mobile communication method performed between a base station with at least one transmission antenna and a mobile station with at least one reception antenna, the method including restoring long-term information and short-term information determined in the mobile station reflecting a first characteristic corresponding to the channel downlink characteristic for each of the transmission and reception antennas from a feedback signal received from the mobile station, spatially processing dedicated physical channel (DPCH) signals using basis information generated from the restored long-term information and short-term information, adding pilot channel (PICH) signals to the spatially processed results, and transmitting the added results to the mobile station, wherein the long-term information includes effective long-term eigenvectors and effective long-term eigenvalues, and the short-term information includes effective short-term eigenvectors and effective short-term eigenvalues.

Preferably, the mobile communication method further includes determining the first characteristic from the PICH signals transmitted from the base station, determining the long-term information and the short-term information based on the first characteristic, converting the long-term information and short-term information to the feedback signal, and transmitting the feedback signal to the base station.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
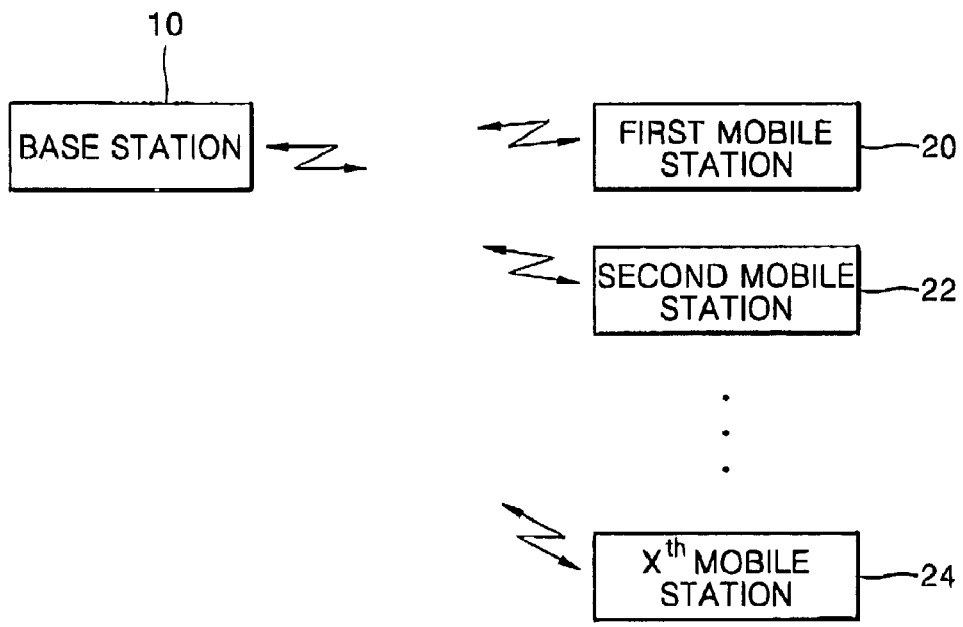
FIG. 1 illustrates a mobile communication apparatus according to an embodiment of the present invention.

Korean Patent Application No. 2001-88234, filed Dec. 29, 2001, and entitled: "Mobile Communication Apparatus with Multiple Transmission and Reception Antennas and Mobile Communication Method Therefor," is incorporated by reference herein in its entirety.

The structure and operation of a mobile communication apparatus having multiple transmission and reception antennas according to various embodiments of the present invention and a mobile communication method performed in the mobile communication apparatus of the present invention will be described with reference to the accompanying drawings. Like reference numerals refer to like elements throughout.

Referring to FIG. 1, which is a schematic view of a mobile communication apparatus according to an embodiment of the present invention, the mobile communication apparatus includes a base station 10, and a first mobile station 20, a second mobile station 22, . . . , and an $X^{th}$ mobile station 24.

Figure 2:
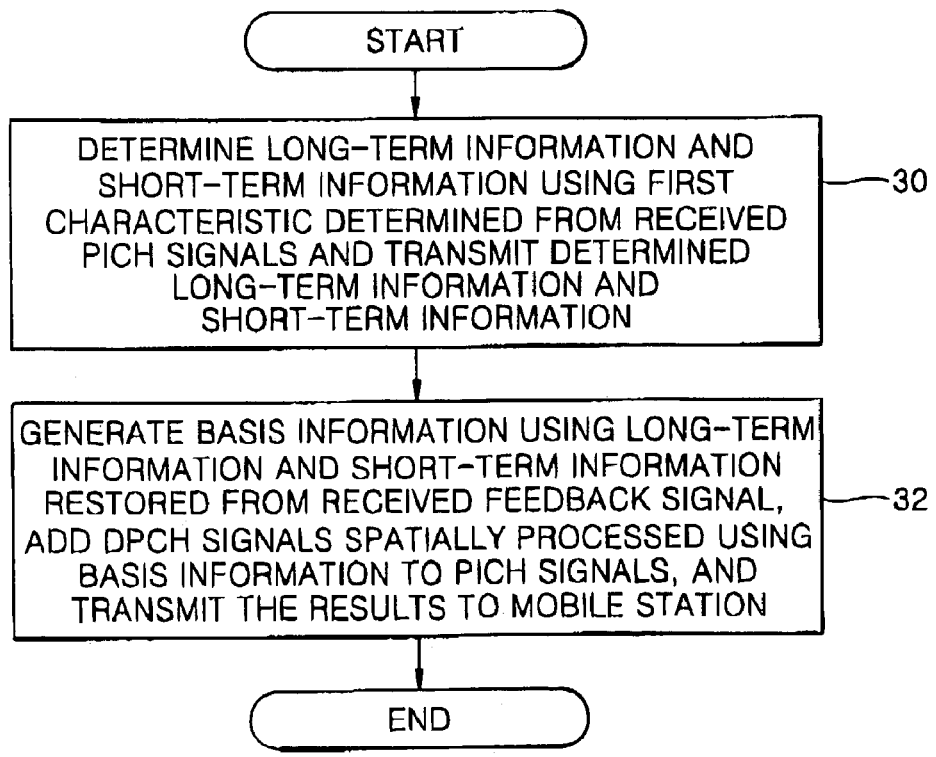
FIG. 2 is a flowchart illustrating a mobile communication method according to an embodiment of the present invention performed in the mobile communication apparatus of FIG. 1.

FIG. 2 is a flowchart illustrating a mobile communication method according to an embodiment of the present invention performed in the mobile communication apparatus shown in FIG. 1. The mobile communication method illustrated in FIG. 2 involves, in step 30, obtaining a feedback signal, and, in step 32, adding dedicated physical channel (DPCH) signals spatially processed using long-term information and short-term information restored from the feedback signal to pilot channel (PICH) signals and transmitting the added results.

Each of the first through $X^{th}$ mobile stations 20 through 24 illustrated in FIG. 1 perform the same function. The base station 10 includes at least one transmission antenna. Each of the first through $X^{th}$ mobile stations 20 through 24 includes at least one reception antenna and may be implemented, for example, with a terminal.

In step 32, the base station 10 of FIG. 1 restores the long-term information and short-term information from the feedback signal received from the first, second, . . . , or $X^{th}$ mobile station 20, 22, . . . , or 24, spatially processes the DPCH signals using basis information generated from the restored long-term information and short-term information, adds the spatially processed DPCH signals to the PICH signals, and transmits the added results to the first, second, . . . , or $X^{th}$ mobile station 20, 22, . . . , or 24. Here, the PICH signals, which are expressed as $P_i(k)$, where $1 \leq i \leq B$, and B is an integer greater than or equal to 1, indicating the number of transmission antennas, may be common pilot channel (CPICH) signals, dedicated CPICH (DCPICH) signals, secondary CPICH (SCPICH) signals, or the like.

When the base station 10 according to the present invention is supported to be able to operate as described above, the first, second, . . . , and $X^{th}$ mobile stations 20, 22, . . . , and 24, each of which has at least one reception antenna, may be implemented with any means provided that the first, second, . . . , and $X^{th}$ mobile stations 20, 22, . . . , and 24 are able to determine long-term and short-term information reflecting the channel downlink characteristic (hereinafter, "first characteristic H", where H is a matrix) for each transmission and reception antenna. As before, bold symbols indicate vectors and non-bold symbols indicate scalars. The channel downlink characteristic H for each transmission and reception antenna represents the phase and amplitude, or gain of a signal transmitted from the base station 10 through a channel to the mobile station 20, 22, . . . , or 24. Here, the matrix of the first characteristic H consists of channels for transmission antennas of the base station 10 in columns and channels for reception antennas of the first, second, . . . , or $X^{th}$ mobile stations 20, 22, . . . , 24 in rows. The column components of the matrix of the first characteristic H are obtained in the transmission antenna space, and the row components thereof are obtained in the reception-antenna space.

As an example, in step 30, the first, second, . . . , or $X^{th}$ mobile station 20, 22, . . . , or 24 determines the first characteristic H from the PICH signals transmitted from the base station 10, determines long-term information and short-term information reflecting the correlation of the characteristics between channels for each transmission and reception antenna from the first characteristic H, converts the determined long-term information and short-term information to a feedback signal, and transmits the feedback signal to the base station. The long-term information includes effective long-term eigenvectors and effective long-term eigenvalues. The short-term information includes effective short-term eigenvectors and effective short-term eigenvalues.

For the convenience of understanding the present invention, embodiments of the first, second, . . . , or $X^{th}$ mobile station 20, 22, . . . , 24 and step 30 according to the present invention will be described first, followed by descriptions of embodiments of the base station 10 and step 32 according to the present invention.

Figure 3:
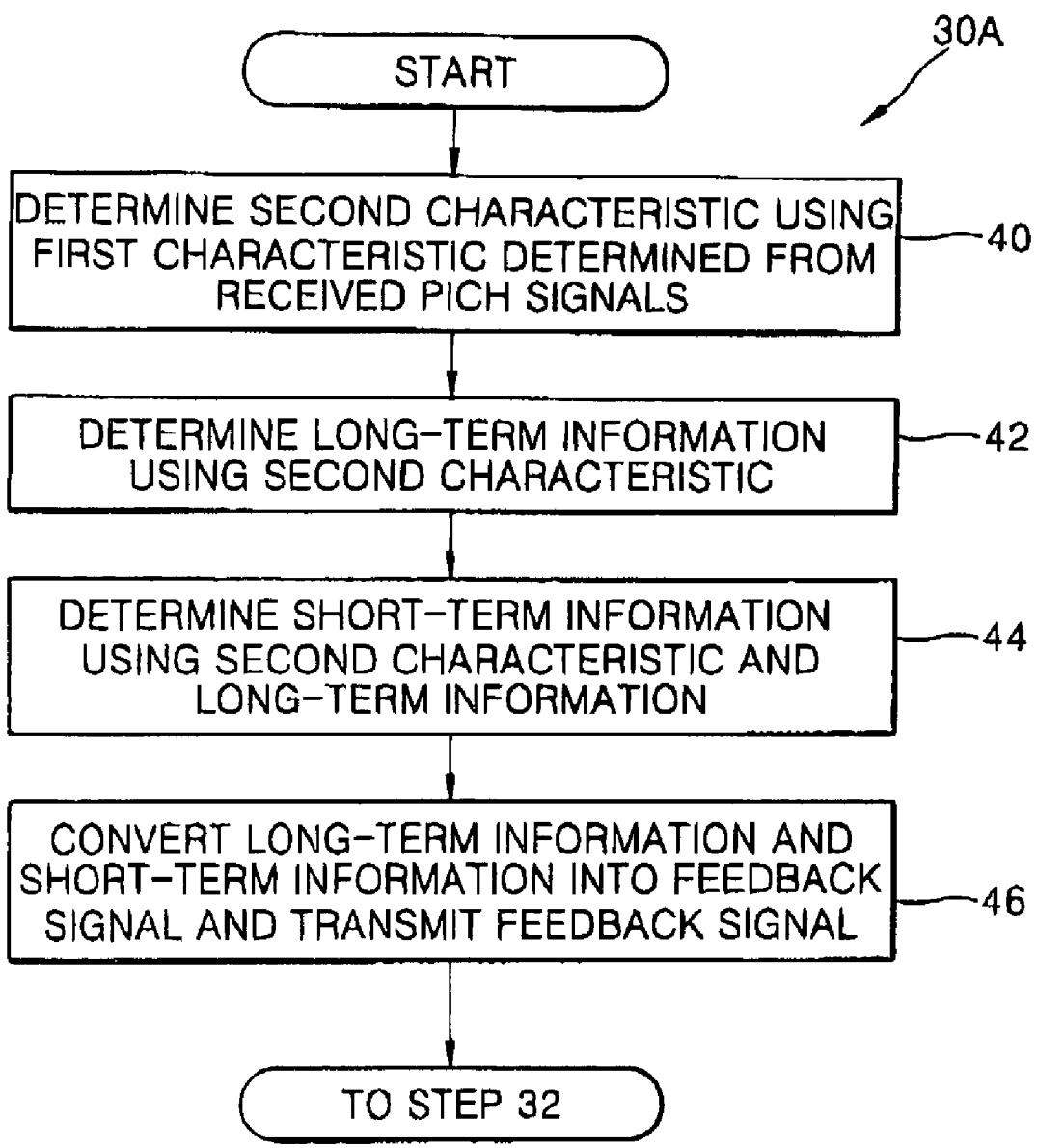
FIG. 3 is a flowchart illustrating an embodiment of step 30 of FIG. 2.

FIG. 3 is a flowchart illustrating an embodiment 30A of step 30 shown in FIG. 2. This embodiment involves, in step 40, determining the first characteristic H, in steps 42 and 44, determining the long-term information and short-term information of the channel, and, in step 46, converting the determined long-term information and short-term information to the feedback signal and transmitting the feedback signal.

Figure 4:
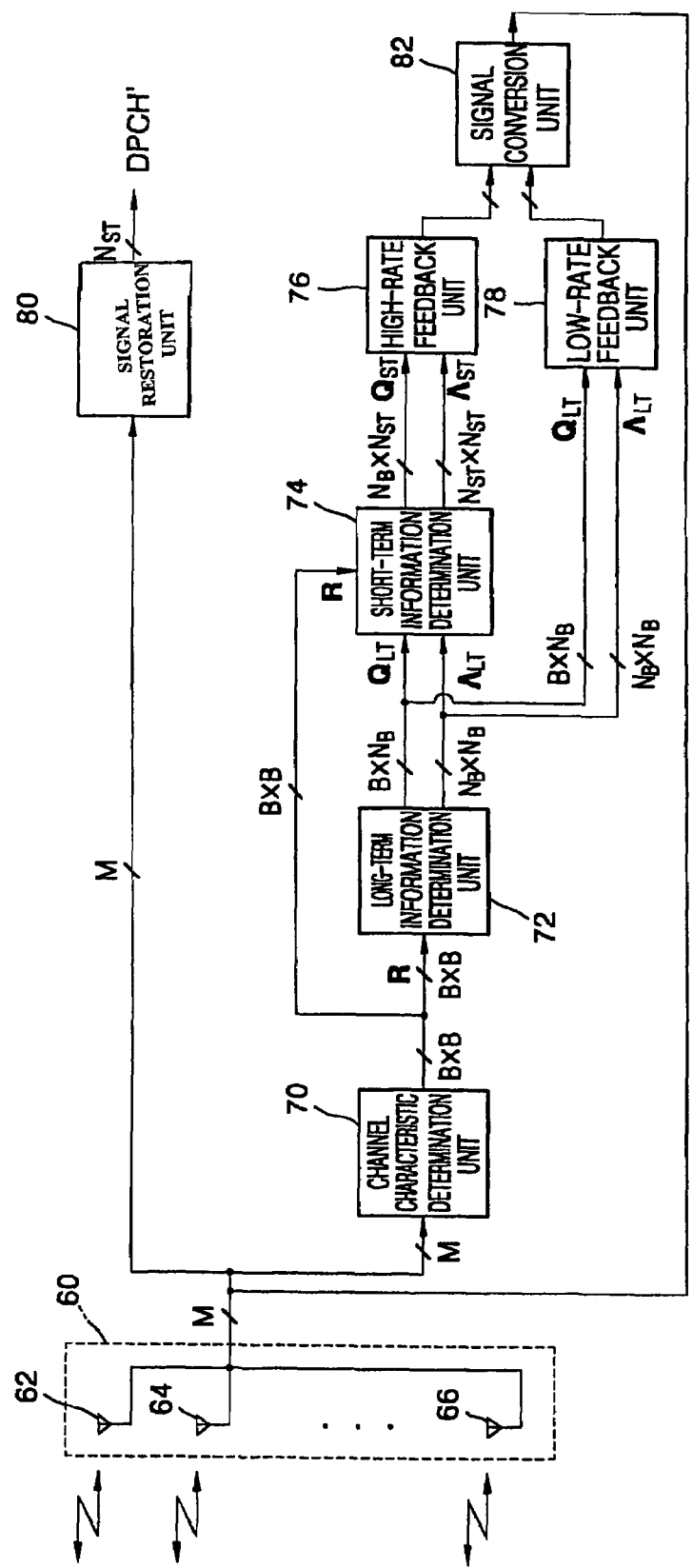
FIG. 4 illustrates a block diagram of an embodiment of a first mobile station, second mobile station, or $X^{th}$ mobile station, shown in FIG. 1.

FIG. 4 illustrates a block diagram of an embodiment of the first mobile station 20, the second mobile station 22, ..., or the $X^{th}$ mobile station 24 shown in FIG. 1. The mobile station shown in FIG. 4 includes an antenna array 60, a channel characteristic determination unit 70, a long-term information determination unit 72, a short-term information determination unit 74, a high-rate feedback unit 76, a low-rate feedback unit 78, a signal restoration unit 80, and a signal conversion unit 82.

The antenna array 60 of FIG. 4 includes M reception antennas 62, 64, ..., 66, where M is a positive integer greater than or equal to 1, and receives the spatially processed DPCH signals and PICH signals transmitted from the base station 10. Referring back to FIG. 3, in step 40, the channel characteristic determination unit 70 initially determines the first characteristic H from the PICH signals transmitted from the base station and received through the antenna array 60, and then determines an instantaneous correlation of the channel downlink characteristic (hereinafter, "second characteristic R") for each transmission and reception antenna from the first characteristic H using equation 1 below, and outputs the determined second characteristic R to the long-term information determination unit 72 and the short-term information determination unit 74. The second characteristic R is expressed as B×B matrix.

$$R = H^H \cdot H \quad (1)$$

After step 40, in step 42, the long-term information determination unit 72 determines effective long-term eigenvectors $Q_{LT}$ and effective long-term eigenvalues $\Lambda_{LT}$, which constitute the long-term information, from the second characteristic R determined by the channel characteristic determination unit 70 and outputs the determined effective long-term eigenvectors $Q_{LT}$ and effective long-term eigenvalues $\Lambda_{LT}$ to the short-term information determination unit 74 and the low-rate feedback unit 78, respectively. Here, long-term eigenvalues have a one-to-one mapping relation with long-term eigenvectors. Long-term eigenvectors which are mapped one-to-one with the effective long-term eigenvalues $\Lambda_{LT}$ are referred to as the effective long-term eigenvectors $Q_{LT}$. The effective long-term eigenvectors $Q_{LT}$ are in a B×$N_B$ matrix. The effective long-term eigenvalues $\Lambda_{LT}$ are in a $N_B \times N_B$ matrix.

Hereinafter, embodiments of step 42 of FIG. 3 and the long-term information determination unit 72 of FIG. 4 will be described with reference to the appended drawings.

Figure 5:
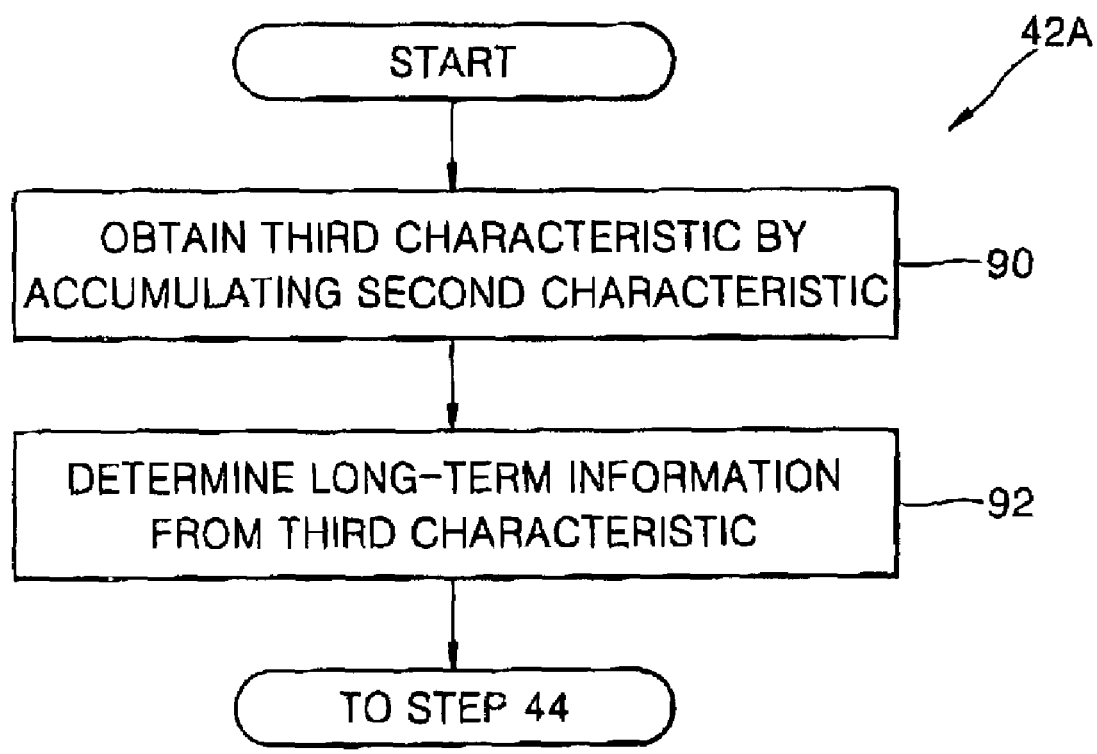
FIG. 5 is a flowchart illustrating a preferred embodiment of step 42 of FIG. 3.

FIG. 5 is a flowchart illustrating a preferred embodiment 42A of step 42 illustrated in FIG. 3. This embodiment, in step 90, involves obtaining a long-term correlation of the channel downlink characteristic (hereinafter, "third characteristic $R_{LT}$") for each transmission and reception antenna by accumulating the second characteristic R and, in step 92, determining the long-term information from the obtained long-term correlation of the channel downlink characteristic.

Figure 6:
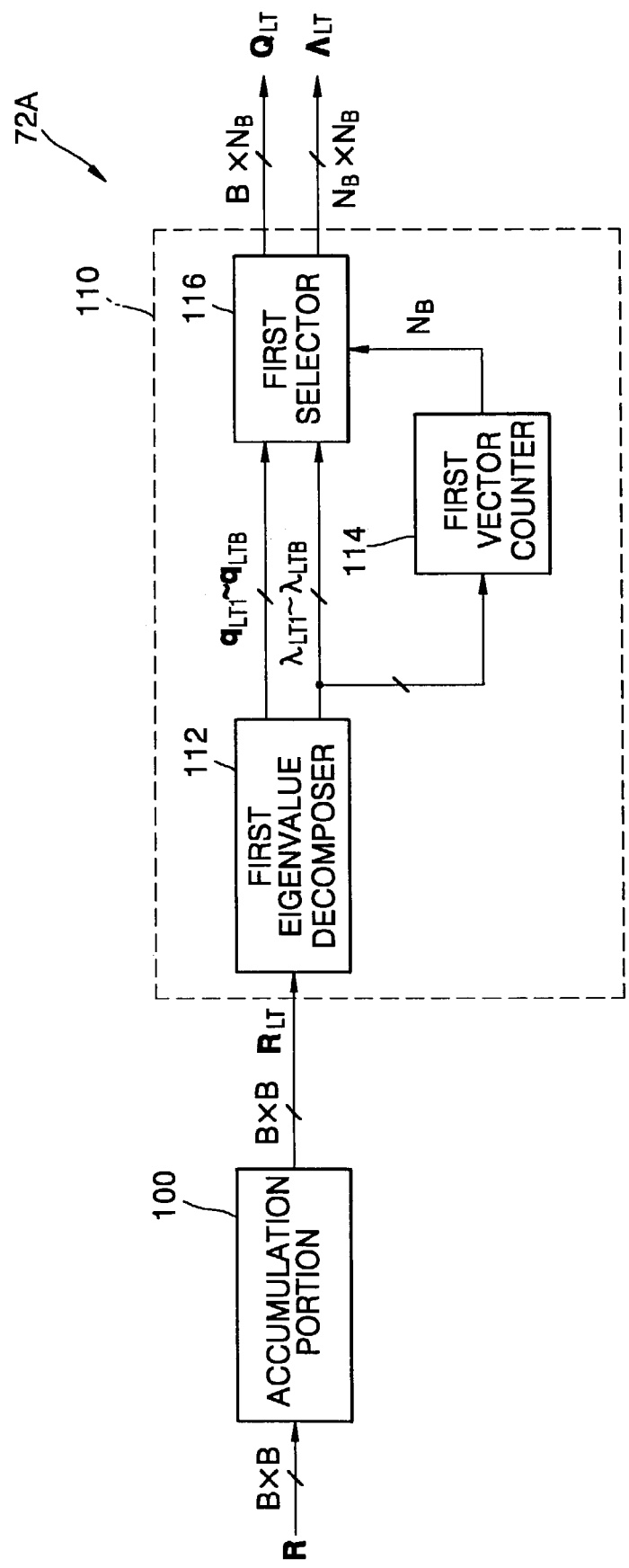
FIG. 6 illustrates a block diagram of an embodiment of a long-term information determination unit of FIG. 4.

FIG. 6 illustrates a block diagram of an embodiment 72A of the long-term information determination unit 72 of FIG. 4. The embodiment 72A includes an accumulation portion 100 and a first eigenvalue decomposition and calculation portion 110.

After step 40 of FIG. 3, in step 90, the accumulation portion 100 of FIG. 6 accumulates the second characteristic R input from the channel characteristic determination unit 70 and outputs the accumulated result $R_{LT}(k)$ to the first eigenvalue decomposition and calculation portion 110 as the third characteristic $R_{LT}$ for each transmission and reception antenna. The third characteristic $R_{LT}$, i.e., the accumulated result $R_{LT}(k)$, is expressed as a B×B matrix, as in equation 2 below:

$$R_{LT} = \Sigma H^H \cdot H = \Sigma R$$

$$R_{LT}(k) = \rho R_{LT}(k-1) + R(k) \quad (2)$$

where $\rho$ is a forgetting factor, and k indicates a discrete time.

After step 90, in step 92, the first eigenvalue decomposition and calculation portion 110 generates the effective long-term eigenvectors $Q_{LT}$ and effective long-term eigenvalues $\Lambda_{LT}$, which correspond to the long-term information, using the third characteristic $R_{LT}$ input from the accumulation portion 100 by an eigenvalue decomposition (EVD) method and outputs the generated effective long-term eigenvectors $Q_{LT}$ and effective long-term eigenvalues $\Lambda_{LT}$ to the short-term information determination unit 74 and the low-rate feedback unit 78, respectively.

Hereinafter, embodiments of step 92 of FIG. 5 and the first eigenvalue decomposition and calculation portion 110 of FIG. 6 of the present invention will be described.

Figure 7:
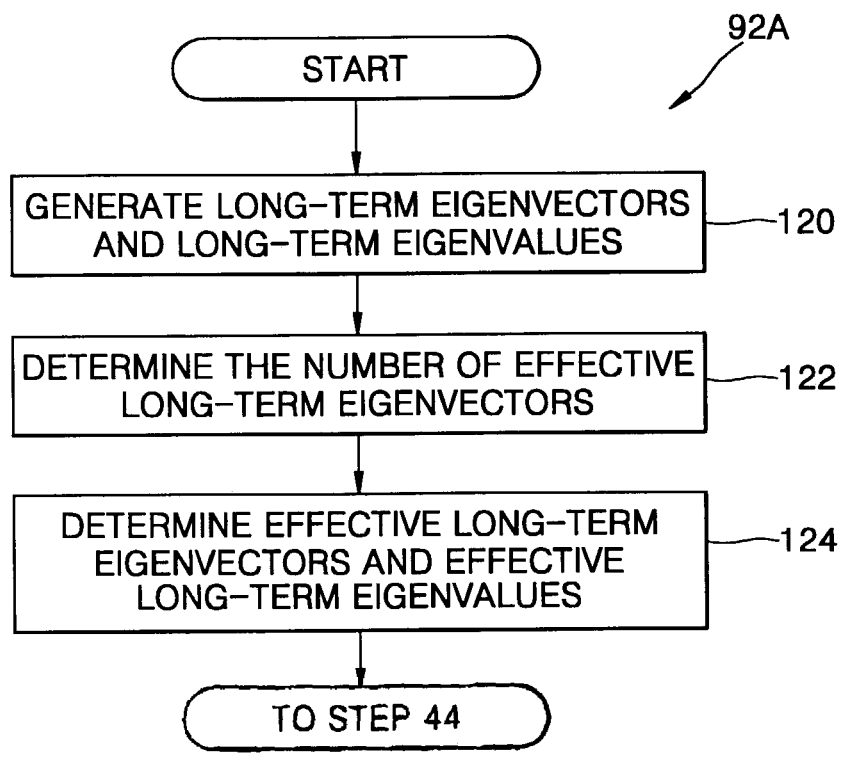
FIG. 7 is a flowchart illustrating an embodiment of step 92 of FIG. 5.

FIG. 7 is a flowchart illustrating an embodiment 92A of step 92 of FIG. 5. The embodiment 92A involves, in steps 120 through 124, selecting the effective long-term eigenvectors $Q_{LT}$ and effective long-term eigenvalues $\Lambda_{LT}$ among long-term eigenvectors and long-term eigenvalues as the long-term information.

To implement the embodiment 92A of FIG. 7, the first eigenvalue decomposition and calculation portion 110 may be implemented with a first eigenvalue decomposer 112, a first vector counter 114, and a first selector 116, as shown in FIG. 6.

After step 90 of FIG. 5, in step 120, the first eigenvalue decomposer 112 generates B long-term eigenvectors $q_{LT1} \sim q_{LTB}$ and B long-term eigenvalues $\lambda_{LT1} \sim \lambda_{LTB}$ using the third characteristic $R_{LT}$ input from the accumulation portion 100 by the above-described EVD method, outputs the generated B long-term eigenvalues $\lambda_{LT1} \sim \lambda_{LTB}$ to the first vector counter 114 and the first selector 116, and outputs the generated B long-term eigenvectors $q_{LT1} \sim q_{LTB}$ to the first selector 116.

After step 120, in step 122, the first vector counter 114 counts the number of long-term eigenvalues $\lambda_{LT1} \sim \lambda_{LTB}$ which are greater than a first predetermined threshold value, determines the counted result as the number of effective long-term eigenvectors $N_B$, where $1 \leq N_B \leq B$, and outputs the determined number of effective long-term eigenvectors $N_B$ to the first selector 116. To this end, the first vector counter 114 may be implemented with a counter (not shown). The first predetermined threshold value is a non-zero value approximating to zero and represents a noise level in the third characteristic $R_{LT}$.

After step 122, in step 124, the first selector 116 selects long-term eigenvectors in a quantity equal to the number of effective long-term eigenvectors $N_B$, from which noises have been removed, among the B long-term eigenvectors $q_{LT1} \sim q_{LTB}$ input from the first eigenvalue decomposer 112 and outputs the selected long-term eigenvectors, which are column vectors, as the effective long-term eigenvectors $Q_{LT}$. Additionally in step 124, the first selector 116 selects long-term eigenvalues in a quantity equal to the number of effective long-term eigenvectors $N_B$, from which noises have been removed, among the B long-term eigenvalues $\lambda_{LT1} \sim \lambda_{LTB}$ input from the first eigenvalue decomposer 112 and outputs the selected long-term eigenvalues in a diagonal matrix as the effective long-term eigenvalues $\Lambda_{LT}$.

Referring back to FIGS. 3 and 4, after step 42 of FIG. 3, in step 44, the short-term information determination unit 74 determines effective short-term eigenvectors $Q_{ST}$ and effective short-term eigenvalues $\Lambda_{ST}$, which correspond to the short-term information, using the second characteristic R input from the channel characteristic determination unit 70 and the long-term information including the effective long-term eigenvectors $Q_{LT}$ and the effective long-term eigenvalues $\Lambda_{LT}$ input from the long-term information determination unit 72, and outputs the determined effective short-term eigenvectors $Q_{ST}$ and effective short-term eigenvalues $\Lambda_{ST}$ to the high-rate feedback unit 76. The effective short-term eigenvectors $Q_{ST}$ are in a $N_B \times N_{ST}$ matrix, and the effective short-term eigenvalues $\Lambda_{ST}$ are in a $N_{ST} \times N_{ST}$ matrix.

Here, $N_{ST}$, which indicates the number of effective short-term eigenvectors $Q_{ST}$, should be smaller than a maximum number of effective short-term eigenvectors $N_{STMAX}$, which is predetermined by a user, and should satisfy $1 \leq N_{ST} \leq N_B \leq B$.

Hereinafter, embodiments of step 44 of FIG. 3 and the short-term information determination unit 74 of FIG. 4 will be described with reference to the appended drawings.

Figure 8:
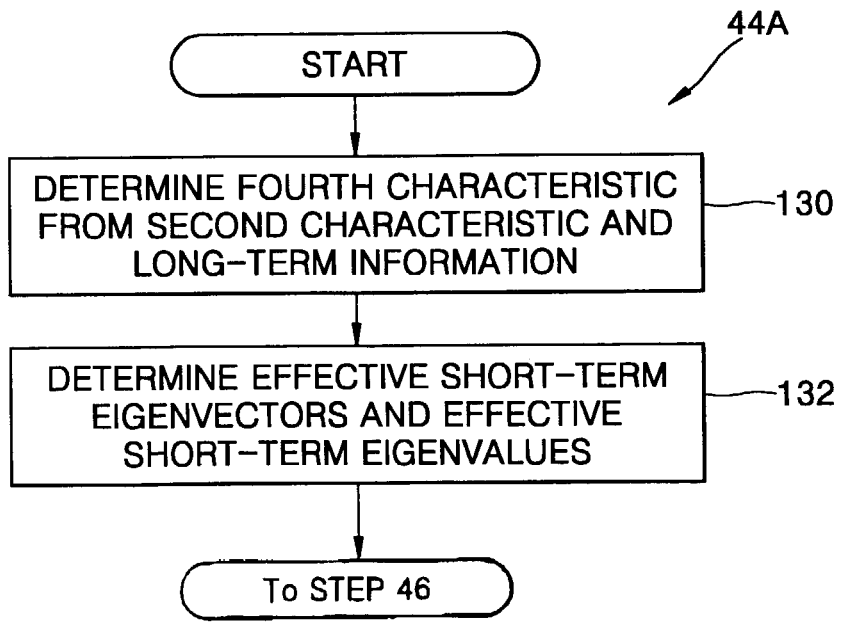
FIG. 8 is a flowchart illustrating an embodiment of step 44 of FIG. 3.

FIG. 8 is a flowchart illustrating an embodiment 44A of step 44 of FIG. 3. The embodiment 44A involves, in step 130, obtaining a short-term correlation of the channel downlink characteristic for each transmission and reception antenna and, in step 132, obtaining the short-term information from the determined short-term correlation of the channel downlink characteristic.

Figure 9:
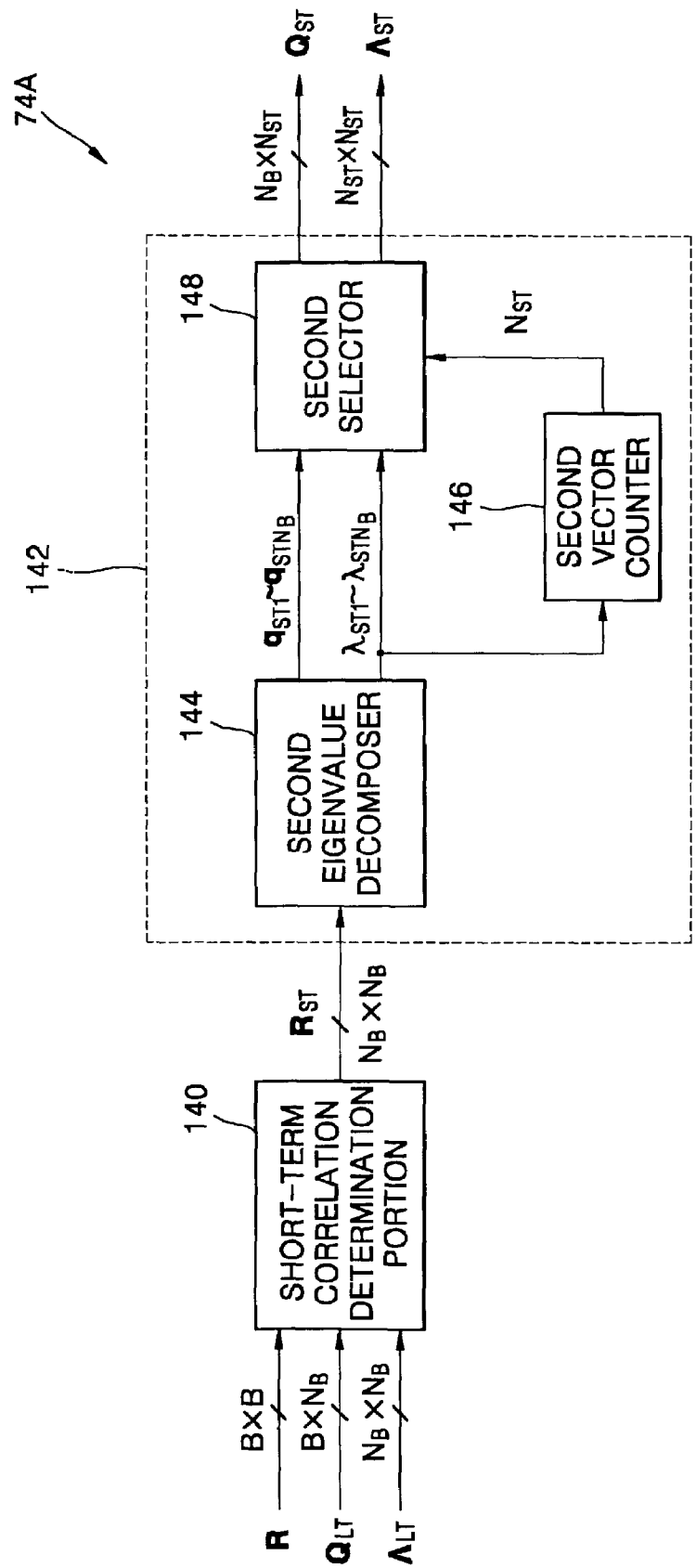
FIG. 9 illustrates a block diagram of a short-term information determination unit of FIG. 4 according to an embodiment of the present invention.

FIG. 9 illustrates a block diagram of an embodiment 74A of the short-term information determination unit 74 of FIG. 4. The embodiment 74A includes a short-term correlation determination portion 140 and a second eigenvalue decomposition and calculation portion 142.

After step 42 of FIG. 3, in step 130, the short-term correlation determination portion 140 determines a short-term correlation (hereinafter, "fourth characteristic $R_{ST}$") of the channel downlink characteristic for each transmission and reception antenna from the second characteristic R input from the channel characteristic determination unit 70 and the long-term information including the effective long-term eigenvectors $Q_{LT}$ and the effective long-term eigenvalues $\Lambda_{LT}$ input from the long-term information determination unit 72, using equation 3 below, and outputs the determined fourth characteristic $R_{ST}$ to the second eigenvalue decomposition and calculation portion 142. The fourth characteristic $R_{ST}$ is expressed as a $N_B \times N_B$ matrix.

$$R_{ST} = \Lambda_{LT}^{-\frac{1}{2}} Q_{LT}^H R Q_{LT} \Lambda_{LT}^{-\frac{1}{2}} \quad (3)$$

After step 130, in step 132, the second eigenvalue decomposition and calculation portion 142 determines the effective short-term eigenvectors $Q_{ST}$ and effective short-term eigenvalues $\Lambda_{ST}$ from the fourth characteristic $R_{ST}$ input from the short-term correlation determination portion 140 by the above-described EVD method and outputs the determined effective short-term eigenvectors $Q_{ST}$ and effective short-term eigenvalues $\Lambda_{ST}$ to the high-rate feedback unit 76 as the short-term information.

Hereinafter, embodiments of step 132 of FIG. 8 and the second eigenvalue decomposition and calculation portion 142 of FIG. 9 will be described.

Figure 10:
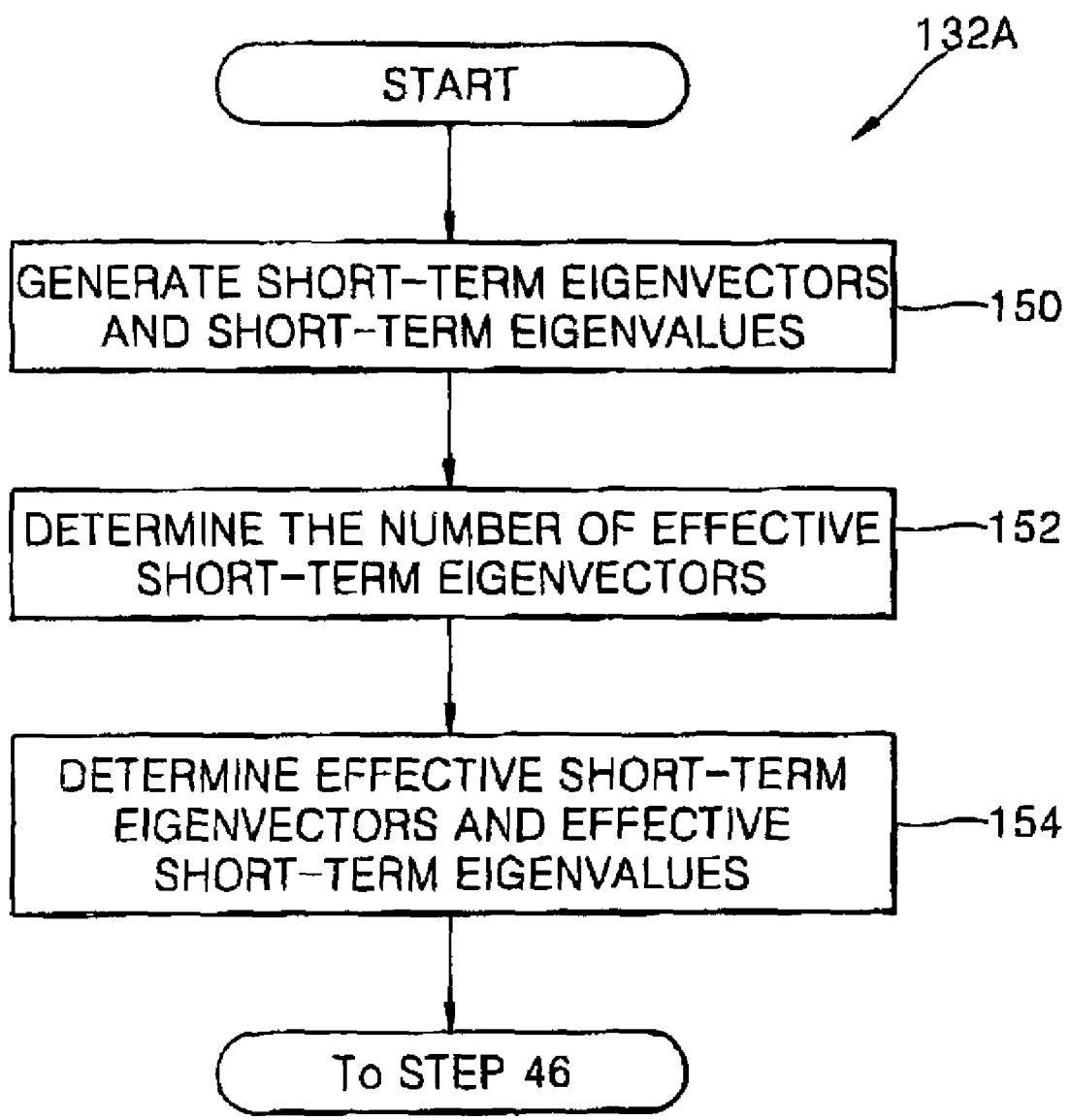
FIG. 10 is a flowchart illustrating an embodiment of step 132 of FIG. 8.

FIG. 10 is a flowchart illustrating an embodiment 132A of step 132 of FIG. 8. The embodiment 132A involves, in steps 150 through 154, selecting the effective short-term eigenvectors $Q_{ST}$ and effective short-term eigenvalues $\Lambda_{ST}$ among short-term eigenvectors and short-term eigenvalues as the short-term information.

To implement the embodiment 132A of FIG. 10, the second eigenvalue decomposition and calculation portion 142 may be implemented with a second eigenvalue decomposer 144, a second vector counter 146, and a second selector 148, as shown in FIG. 9.

After step 130 of FIG. 8, in step 150, the second eigenvalue decomposer 144 generates $N_B$ short-term eigenvectors $q_{ST1} \sim q_{STNB}$ and $N_B$ short-term eigenvalues $\lambda_{ST1} \sim \lambda_{STNB}$ using the fourth characteristic $R_{ST}$ input from the short-term correlation determination portion 140 by the above-described EVD method and outputs the generated $N_B$ short-term eigenvalues $\lambda_{ST1} \sim \lambda_{STNB}$ to the second vector counter 146 and the second selector 148 and the generated $N_B$ short-term eigenvectors $q_{ST1} \sim q_{STNB}$ to the second selector 148.

After step 150, in step 152, the second vector counter 146 counts the number of short-term eigenvalues $\lambda_{ST1} \sim \lambda_{STNB}$ which are greater than a second predetermined threshold value, determines the number of effective short-term eigenvectors $N_{ST}$ based on the counted result and the above-described maximum number of effective short-term eigenvectors $N_{STMAX}$, and outputs the determined number of effective short-term eigenvectors $N_{ST}$ to the second selector 148. In particular, if the counted result is equal to or greater than the maximum number of effective short-term eigenvectors $N_{STMAX}$, the second vector counter 146 outputs the maximum number of effective short-term eigenvectors $N_{STMAX}$ as the number of effective short-term eigenvectors $N_{ST}$. If the counted result is smaller than the maximum number of effective short-term eigenvectors $N_{STMAX}$, the second vector counter 146 outputs the counted result as the number of effective short-term eigenvectors $N_{ST}$. To this end, the second vector counter 146 may be implemented with a counter (not shown). The second predetermined threshold value is a non-zero value approximating to zero and represents a noise level in the fourth characteristic $R_{ST}$.

After step 152, in step 154, the second selector 148 selects short-term eigenvectors in a quantity equal to the number of effective short-term eigenvectors $N_{ST}$, from which noises have been removed, among the $N_B$ short-term eigenvectors $q_{ST1} \sim q_{STNB}$ input from the second eigenvalue decomposer 144 and outputs the selected short-term eigenvectors, which are column vectors, as the effective short-term eigenvectors $Q_{ST}$. Additionally in step 154, the second selector 148 selects short-term eigenvalues in a quantity equal to the number of effective short-term eigenvectors $N_{ST}$, from which noises have been removed, among the $N_B$ short-term eigenvalues $\lambda_{ST1} \sim \lambda_{STNB}$ input from the second eigenvalue decomposer 144 and outputs the selected short-term eigenvalues in a diagonal matrix as the effective short-term eigenvalues $\Lambda_{ST}$.

Referring back to FIGS. 3 and 4, after step 44 of FIG. 3, in step 46, the first mobile station 20, the second mobile station 22, . . . , or the $X^{th}$ mobile station 24 converts the short-term information, including the effective short-term eigenvectors $Q_{ST}$ and effective short-term eigenvalues $\Lambda_{ST}$, and the long-term information, including the effective long-term eigenvectors $Q_{LT}$ and the effective long-term eigenvalues $\Lambda_{LT}$, to a feedback signal which is suitable to be fed back to the base station 10 and transmits the converted feedback signal via the antenna array 60 to the base station 10. To perform step 46, the high-rate feedback unit 76, the low-rate feedback unit 78, and the signal conversion unit 82 are involved. The high-rate feedback unit 76 encodes the short-term information, including the effective short-term eigenvectors $Q_{ST}$ and effective short-term eigenvalues $\Lambda_{ST}$, input from the short-information determination unit 74 to bits and outputs the result of the bit encoding to the signal conversion unit 82 at first predetermined time intervals. The low-rate feedback unit 78 encodes the long-term information, including the effective long-term eigenvectors $Q_{LT}$ and the effective long-term eigenvalues $\Lambda_{LT}$, input from the long-term information determination unit 72 to bits and outputs the result of the bit encoding to the signal conversion unit 82 at second predetermined time intervals. Here, the first predetermined time interval is shorter than the second predetermined time interval. For example, the second predetermined time interval may be ten (10) times longer than the first predetermined time interval. In this case, one bit of the long-term information is output from the low-rate feedback unit 78 to the signal conversion unit 82 while 10 bits of the short-term information is output from the high-rate feedback unit 76 to the signal conversion unit 82. Accordingly, the short information can be transmitted to the signal conversion unit 82 faster than the long-term information. The signal conversion unit 82 multiplexes the short-term information input from the high-rate feedback unit 76 and the long-term information input from the low-rate feedback unit 78 and outputs the multiplexed result to the antenna array 60 as the feedback signal suitable to be fed back. The feedback signal input to the antenna array 60 is transmitted to the base station 10.

According to the present invention, the first mobile station 20, the second mobile station 22, or the $X^{th}$ mobile station 24 may further include a signal restoration unit 80, as shown in FIG. 4. At any point of time during steps 40 through 46, the signal restoration unit 80 restores original DPCH signals from the DPCH signals spatially processed in the base station 10 and input via the antenna array 60 and outputs restored DPCH signals, which will be denoted by DPCH'.

Hereinafter, embodiments of the base station 10 of FIG. 1 and step 32 of FIG. 2 according to the present invention will be described with reference to the appended drawings.

Figure 11:
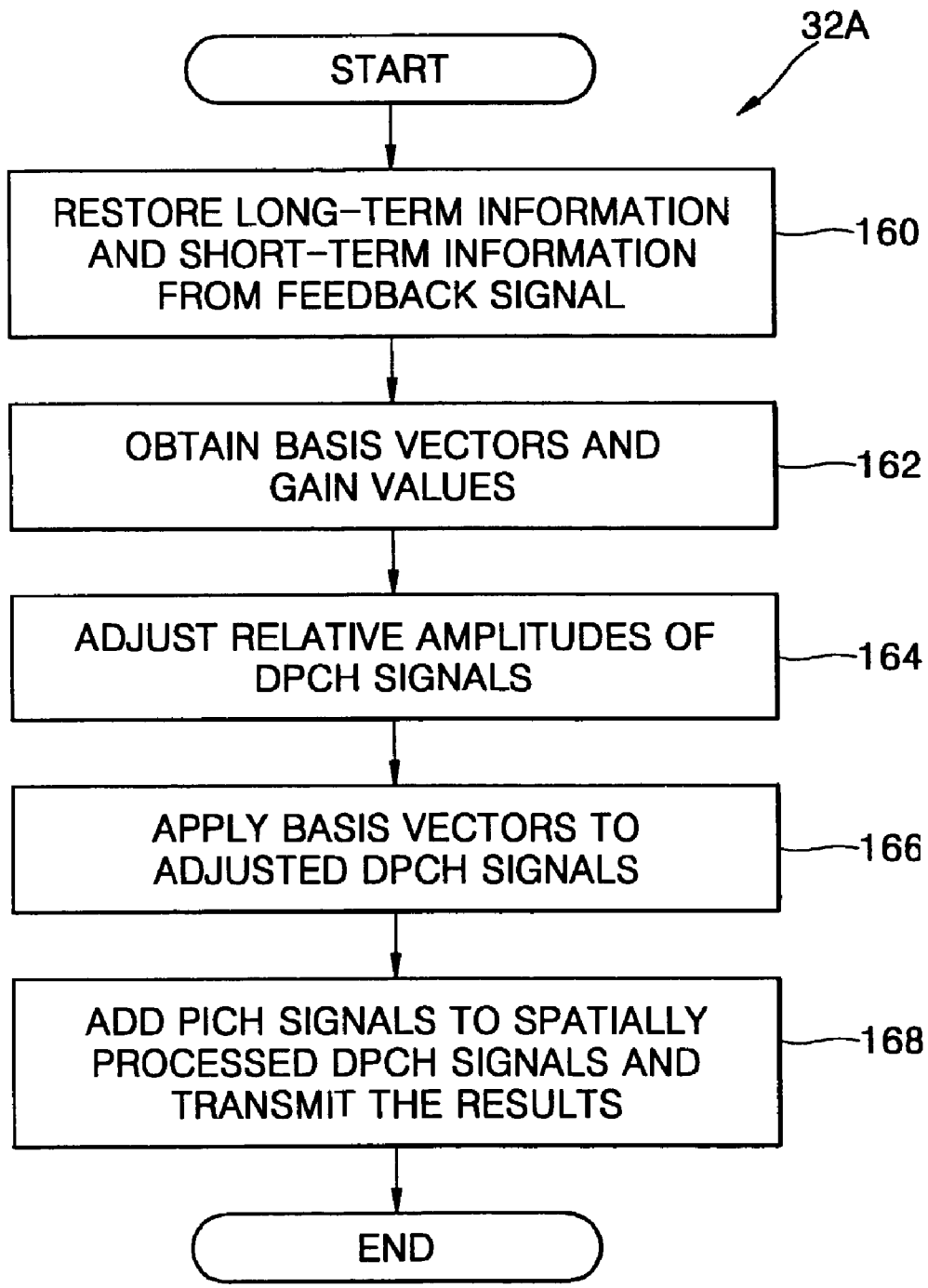
FIG. 11 is a flowchart illustrating an embodiment of step 32 of FIG. 2.

FIG. 11 is a flowchart illustrating an embodiment 32A of step 32 of FIG. 2. The embodiment 32A involves, in steps 160 through 166, spatially processing the DPCH signals using restored long-term information and short-term information and, in step 168, adding pilot channel (PICH) signals to the spatially processed DPCH signals.

Figure 12:
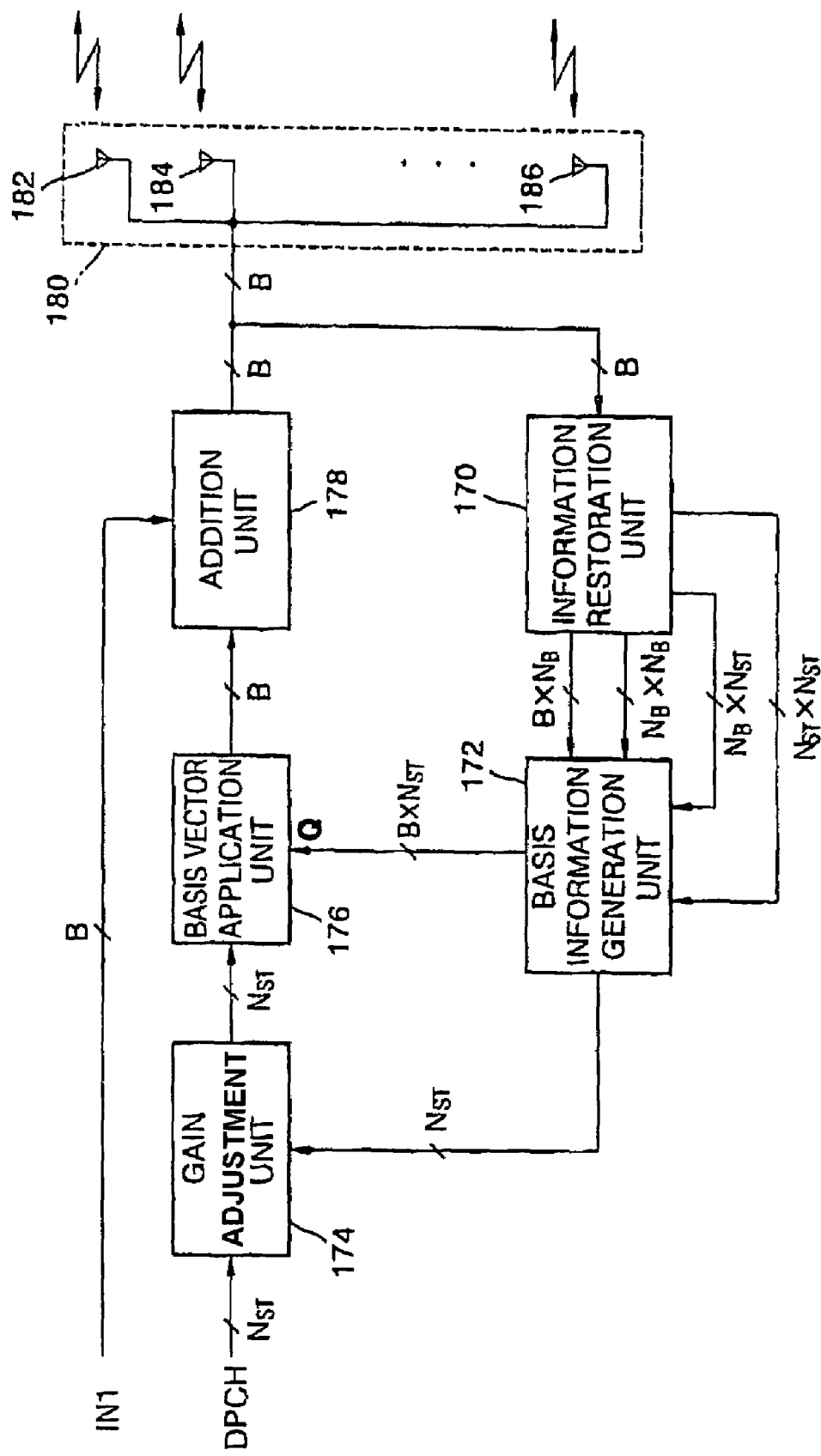
FIG. 12 illustrates a block diagram of an embodiment of a base station of FIG. 1.

FIG. 12 illustrates a block diagram of an embodiment of the base station 10 of FIG. 1. In this embodiment, the base station includes an information restoration unit 170, a basis information generation unit 172, a gain adjustment unit 174, a basis vector application unit 176, an addition unit 178, and an antenna array 180.

The antenna array 180 of FIG. 12, which includes B transmission antennas 182, 184, . . . , 186, receives the feedback signal via an uplink dedicated physical control channel DPCCH from the first mobile station 22, the second mobile station 22, . . . , or the $X^{th}$ mobile station 24 and transmits the spatially processed DPCH signals and the PICH signals to the first mobile station 20, the second mobile station 22, . . . , or the $X^{th}$ mobile station 24.

After step 30 of FIG. 2, in step 160, the information restoration unit 170 restores the long-term information and short-term information from the feedback signal received via the antenna array 180 and outputs the restored long-term information and short-term information to the basis information restoration unit 172. Since the long-term information and short-term information are output from the high-rate feedback unit 76 and the low-rate feedback unit 78 at low and high rates, respectively, via the signal conversion unit 82, the long-term information and short-term information are restored at low and high rates, respectively, by the information restoration unit 170.

After step 160, in step 162, the basis information generation unit 172 generates basis vectors Q and basis values $\Lambda$ as basis information from the long-term information and short-term information restored by the information restoration unit 170, obtains gain values $P^{1/2}$ from the generated basis values $\Lambda$ and outputs the obtained gain values $P^{1/2}$ to the gain adjustment unit 174, and outputs the generated basis vectors Q to the basis vector application unit 176. Here, the basis vectors Q are in a $B \times N_{ST}$ matrix, and the basis values $\Lambda$ are in a $N_{ST} \times N_{ST}$ matrix.

Hereinafter, embodiments of step 162 of FIG. 11 and the basis information generation unit 172 of FIG. 12 will be described with reference to the appended drawings.

Figure 13:
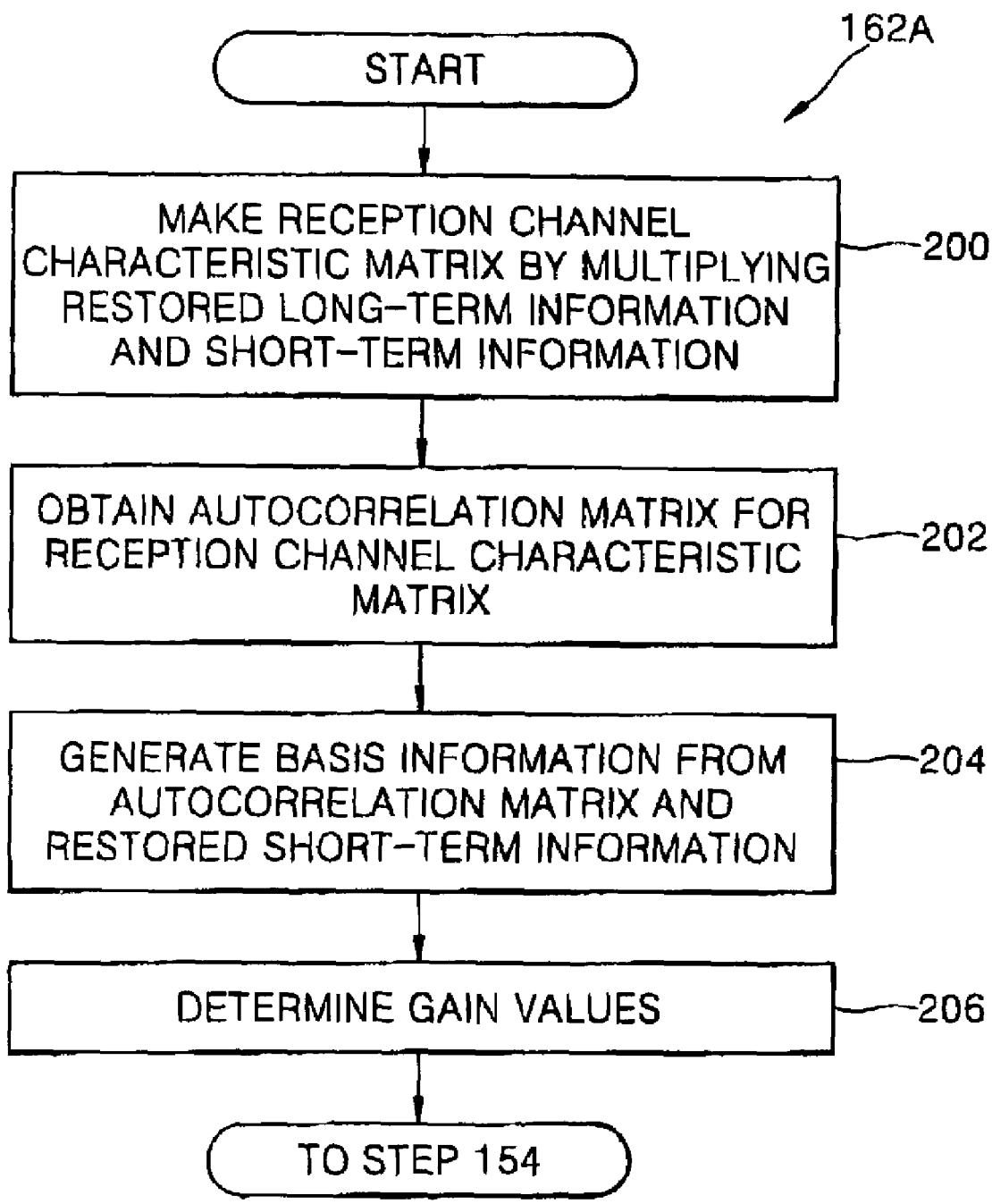
FIG. 13 is a flowchart illustrating an embodiment of step 162 of FIG. 11.

FIG. 13 is a flowchart illustrating an embodiment 162A of step 162 of FIG. 11. The embodiment 162A involves, in steps 200 through 206, determining the basis vectors Q and gain values $P^{1/2}$ from the results of multiplying the restored long-term information and short-term information.

Figure 14:
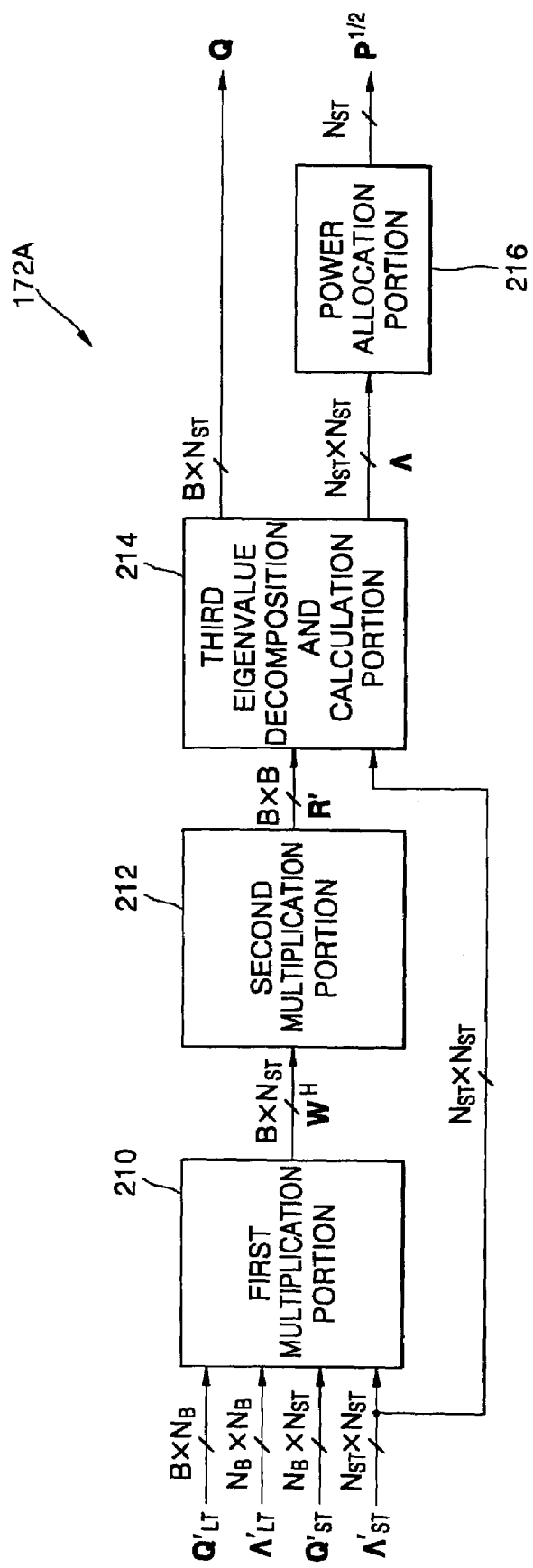
FIG. 14 illustrates a block diagram of an embodiment of a basis information generation unit of FIG. 12.

FIG. 14 illustrates a block diagram of an embodiment 172A of the basis information generation unit 172 of FIG. 12. The embodiment 172A includes a first multiplication portion 210, a second multiplication portion 212, a third eigenvalue decomposition and calculation portion 214, and a power allocation portion 216.

After step 160 of FIG. 11, in step 200, the first multiplication portion 210 multiplies the long-term information and short-term information restored by the information restoration unit 170 as in equation 4 below and outputs the product $W^H$ to the second multiplication portion 212 as a reception channel characteristic matrix. Here, the reception channel characteristic matrix $W^H$ is a $B \times N_{ST}$ matrix.

$$W^H = Q_{LT}' \Lambda_{LT}'^{1/2} Q_{ST}' \Lambda_{ST}'^{1/2} \tag{4}$$

where $Q_{LT}'$ and $\Lambda_{LT}'$ denote the long-term information restored by the information restoration unit 170, and particularly, $Q_{LT}'$ denotes restored effective long-term eigenvectors in a $B \times N_B$ matrix, and $\Lambda_{LT}'$ denotes restored effective long-term eigenvalues in a $N_B \times N_B$ matrix, and $Q_{ST}'$ and $\Lambda_{ST}'$ denote the short-term information restored by the information restoration unit 170, and particularly, $Q_{ST}'$ denotes restored effective short-term eigenvectors in a $N_B \times N_{ST}$ matrix, and $\Lambda_{ST}'$ denotes restored effective short-term eigenvalues in a $N_{ST} \times N_{ST}$ matrix.

After step 200, in step 202, the second multiplication portion 212 calculates an autocorrelation matrix R', which corresponds to the square of the reception channel characteristic matrix $W^H$ output from the first multiplication portion 212 as the product, using equation 5 below, and outputs the calculated autocorrelation matrix R' to the third eigenvalue decomposition and calculation portion 214. Here, the autocorrelation matrix R' is a $B \times B$ matrix.

$$R' = W^H W \tag{5}$$

After step 202, in step 204, the third eigenvalue decomposition and calculation portion 214 generates effective instantaneous eigenvectors, i.e., the basis vectors Q, and effective instantaneous eigenvalues, i.e., the basis values Λ, from the autocorrelation matrix R' and the restored short-term information, i.e., the effective short-term eigenvalues $Λ_{ST}'$ or effective short-term eigenvectors $Q_{ST}'$, and outputs the generated basis vectors Q and basis values Λ as the basis information.

Hereinafter, embodiments according to the present invention of step 204 of FIG. 13 and the third eigenvalue decomposition and calculation portion 214 of FIG. 14 will be described with reference to the appended drawings.

Figure 15:
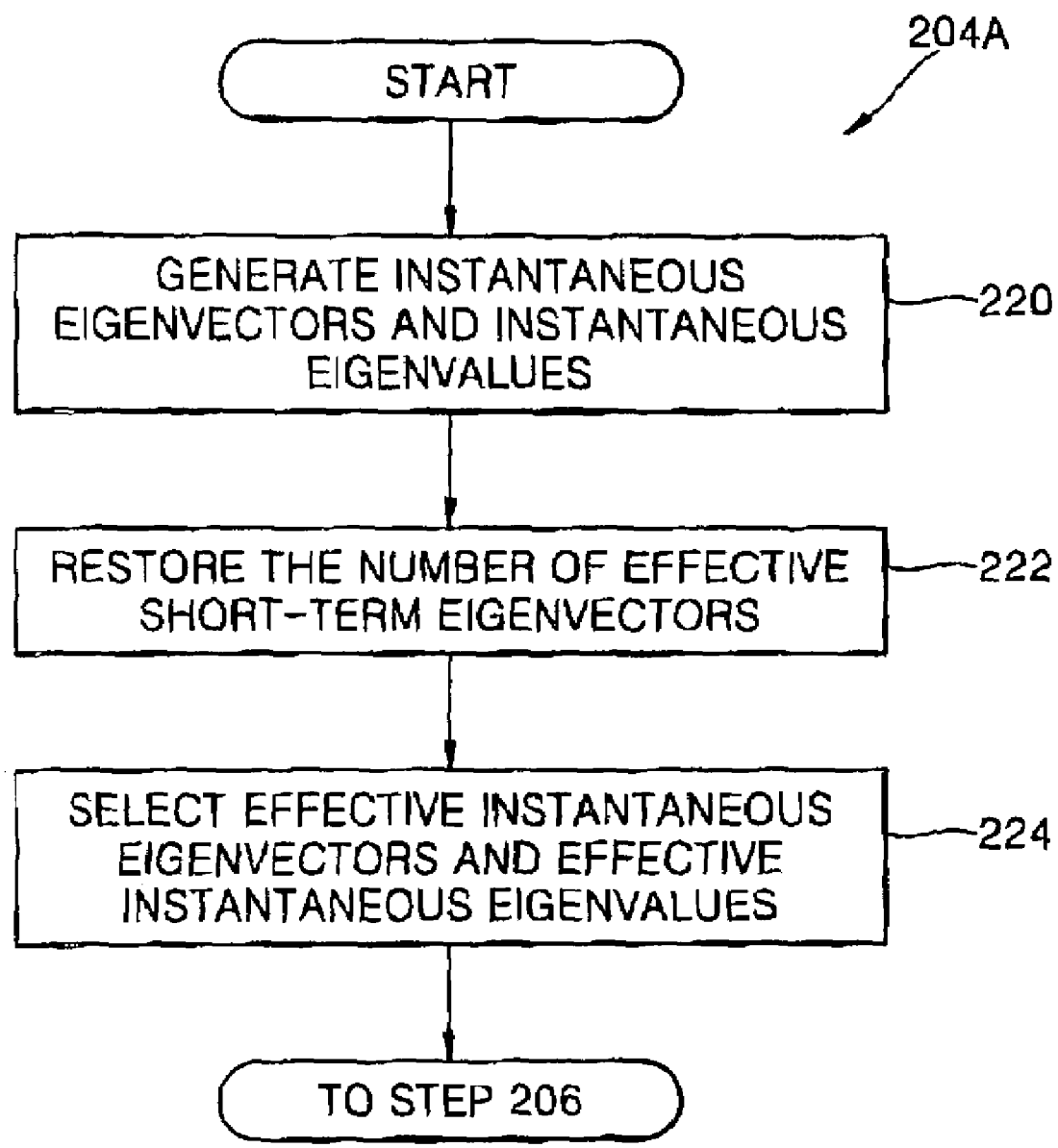
FIG. 15 is a flowchart illustrating an embodiment of step 204 of FIG. 13.

FIG. 15 is a flowchart illustrating an embodiment 204A of step 204 of FIG. 13. The embodiment 204A involves, in steps 220 through 224, selecting effective instantaneous eigenvectors and eigenvalues among instantaneous eigenvectors and eigenvalues as instantaneous information, i.e., the basis information.

Figure 16:
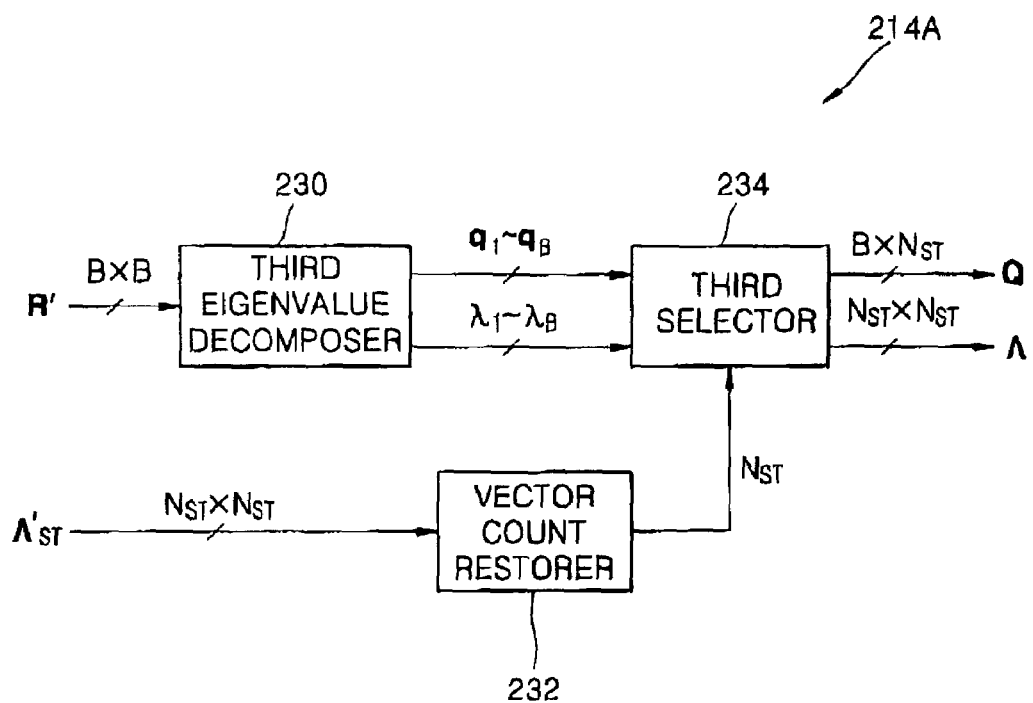
FIG. 16 illustrates a block diagram of a preferred embodiment of a third eigenvalue decomposition and calculation portion of FIG. 13, which performs the embodiment of FIG. 15.

FIG. 16 illustrates a block diagram of a preferred embodiment 214A of the third eigenvalue decomposition and calculation portion 214 of FIG. 14 for performing the embodiment 204A of FIG. 15. The embodiment 214A of the third eigenvalue decomposition and calculation portion 214 includes a third eigenvalue decomposer 230, a vector count restorer 232, and a third selector 234.

After step 202 of FIG. 13, in step 220, the third eigenvalue decomposer 230 generates B instantaneous eigenvectors $q_1$~$q_B$ and B instantaneous eigenvalues $λ_1$~$λ_B$ from the autocorrelation matrix R' input from the second multiplication portion 212 by the above-described EVD method and outputs the B instantaneous eigenvectors $q_1$~$q_B$ and B instantaneous eigenvalues $λ_1$~$λ_B$ to the third selector 234.

After step 220, in step 222 and as shown in FIG. 16, the vector count restorer 232 restores the above-described number $N_{ST}$ of effective short-term eigenvectors using the effective short-term eigenvalues $Λ_{ST}'$ input from the information restoration unit 170 and outputs the restored number $N_{ST}$ of effective short-term eigenvectors to the third selector 234. As an alternative to the illustration in FIG. 16, the vector count restorer 232 can restore the number $N_{ST}$ of effective short-term eigenvectors from the effective short-term eigenvectors $Q_{ST}'$ input from the information restoration unit 170.

After step 222, in step 224, the third selector 234 selects instantaneous eigenvectors in a quantity equal to the number $N_{ST}$ of effective short-term eigenvectors, from which noises have been removed, among the B instantaneous eigenvectors $q_1$~$q_B$ input from the third eigenvalue decomposer 230 and selects instantaneous eigenvalues in a quantity equal to the number $N_{ST}$ of effective short-term eigenvectors, from which noises have been removed, among the B instantaneous eigenvalues $λ_1$~$λ_B$ input from the third eigenvalue decomposer 230. Additionally in step 224, the third selector 234 outputs the selected instantaneous eigenvectors, which are column vectors, as the effective instantaneous eigenvectors, i.e., the basis vectors Q, and the selected instantaneous eigenvalues in a diagonal matrix as the effective instantaneous eigenvalues, i.e., the basis values Λ.

According to the present invention, as an alternative to the illustration in FIG. 15, step 220 and step 222 may be performed simultaneously. As a further alternative, step 222 may be performed prior to step 220.

After step 204 of FIG. 13, in step 206, the power allocation portion 216 obtains a power allocation ratio for channels using the basis values Λ input from the third eigenvalue decomposition and calculation portion 214 and signal-to-noise ratios and allocates the total power given to the base station 10 among the channels using the obtained power allocation ratio. The power allocation portion 216 outputs the allocated results to the gain adjustment unit 174 as the gain values $P^{1/2}$. Here, the power allocation portion 216 may calculate the power allocation ratio from the basis values Λ and the signal-to-noise ratios by a water filtering method. Although the signal-to-noise ratios are illustrated as being previously stored in the power allocation portion 216, the signal-to-noise ratios may be externally input, unlike the illustration of FIG. 14.

After step 162 of FIG. 11, in step 164, the gain adjustment unit 174 adjusts the relative amplitudes of the DPCH signals according to the gain values $P^{1/2}$ input from the basis information generation unit 172 and outputs the amplitude-adjusted DPCH signals to the basis vector application unit 176.

Hereinafter, an embodiment of step 164 of FIG. 11 will be described with reference to the appended drawings.

Figure 17:
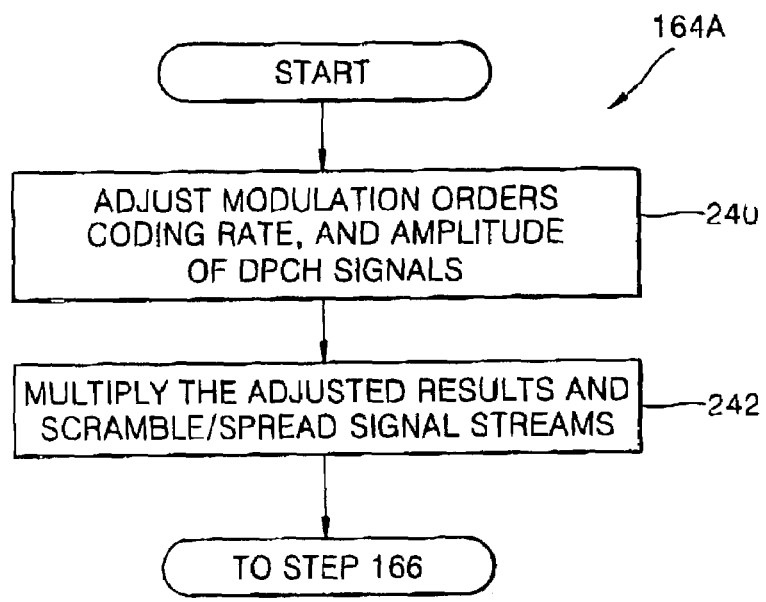
FIG. 17 is a flowchart illustrating an embodiment of step 164 of FIG. 11.

FIG. 17 is a flowchart illustrating an embodiment 164A of step 164 of FIG. 11. The embodiment 164A involves, in step 240, adjusting modulation orders, coding rate, and amplitude of the DPCH signals, and, in step 242, spreading and scrambling the DPCH signals having the adjusted results.

Referring to FIG. 17, after step 162 of FIG. 11, in step 240, the modulation orders, coding rate, and amplitude of the DPCH signals are adjusted.

Hereinafter, embodiments of step 240 of FIG. 17 and the gain adjustment unit 174 of FIG. 12 will be described with reference to the appended drawings.

Figure 18:
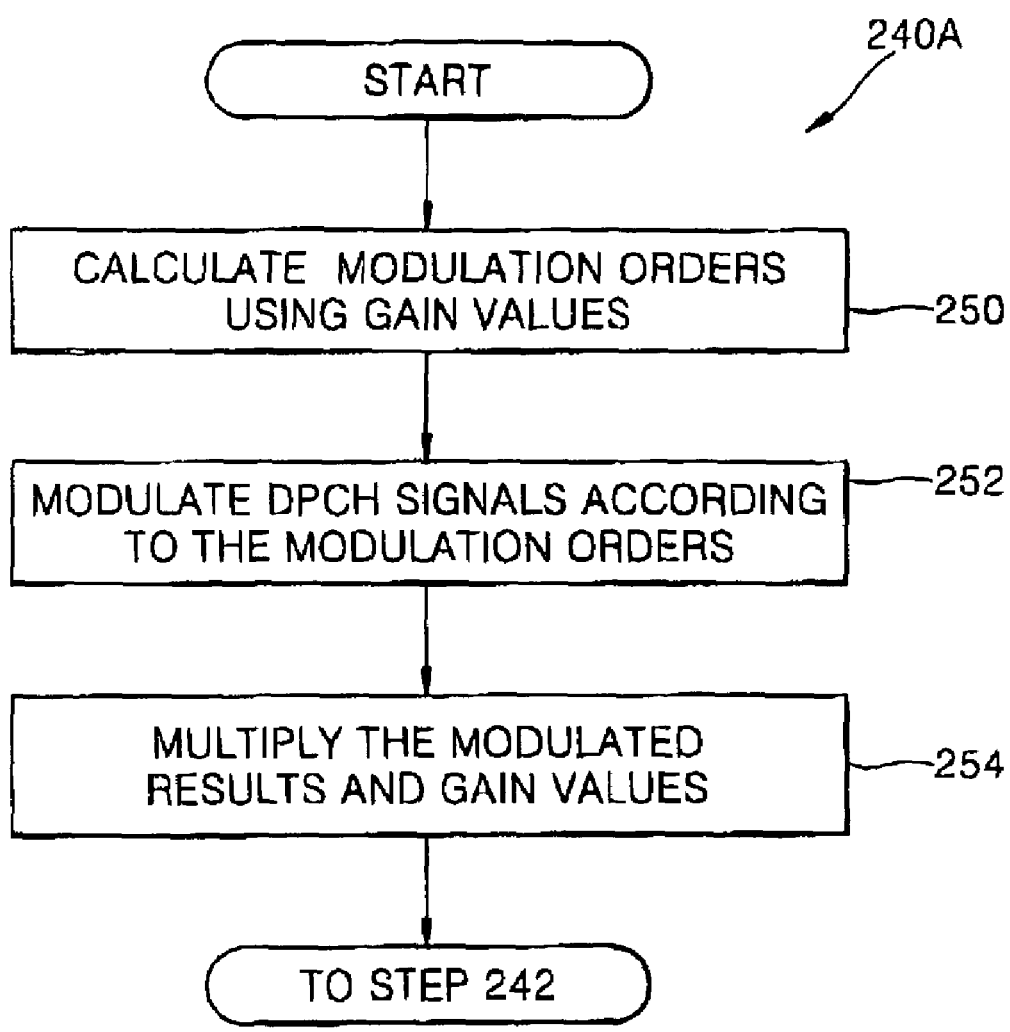
FIG. 18 is a flowchart illustrating an embodiment of step 240 of FIG. 17.

FIG. 18 is a flowchart illustrating an embodiment 240A of step 240 of FIG. 17. The embodiment 240A involves, in steps 250 through 254, multiplying DPCH signals according to those modulation orders calculated using the gain values, by the gain values.

Figure 19:
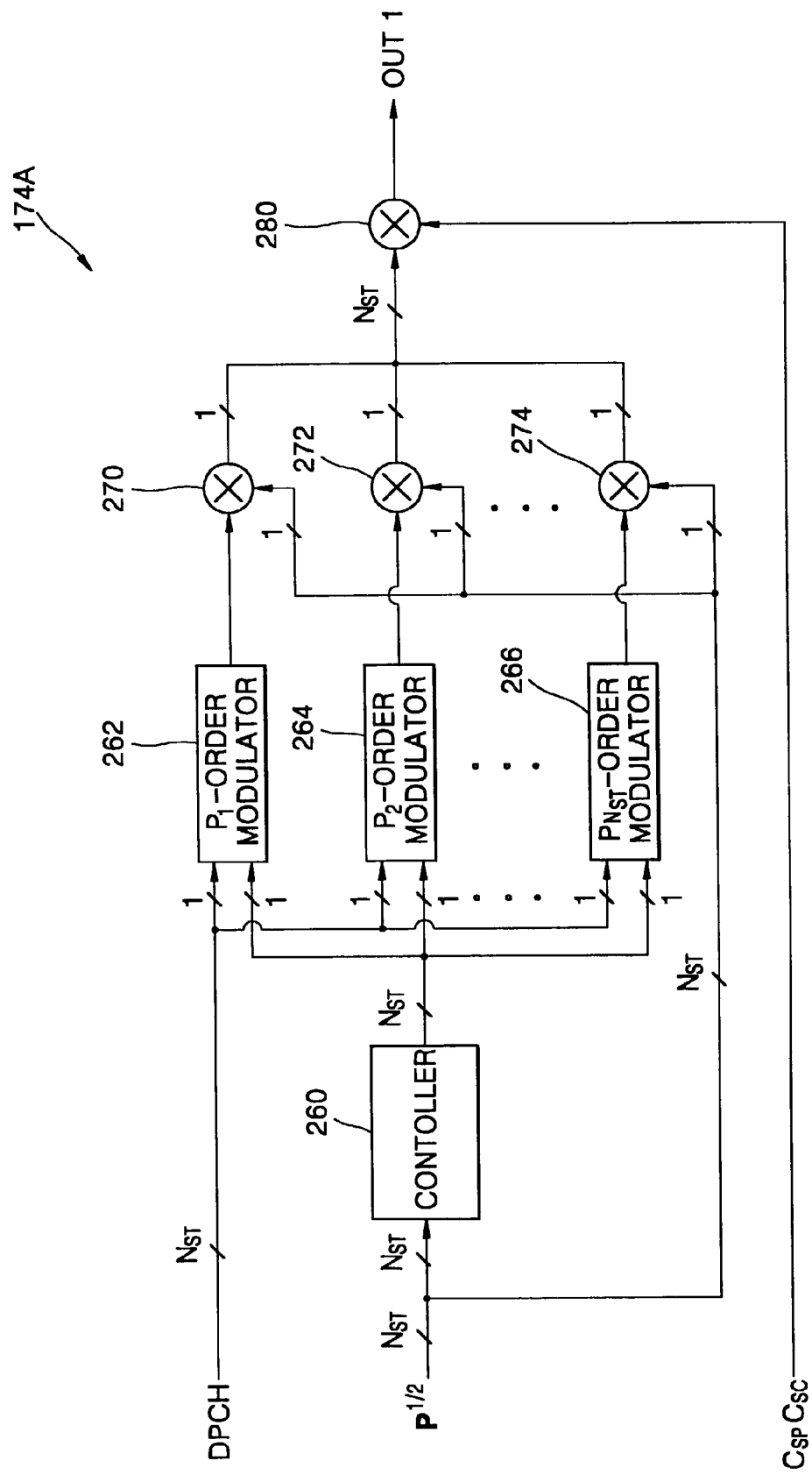
FIG. 19 illustrates a block diagram of a preferred embodiment of a gain adjustment unit of FIG. 12.

FIG. 19 illustrates a block diagram of a preferred embodiment 174A of the gain adjustment unit 174 of FIG. 12. The embodiment 174A of the gain adjustment unit 174 includes a controller 260, $P_1$-order, $P_2$-order, . . . , and $P_{N_{ST}}$-order modulators 262, 264, . . . , and 266, first, second, . . . , and $N_{ST}$ multipliers 270, 272, . . . , and 274, and a $(N_{ST}+1)^{th}$ multiplier 280.

After step 162, in step 250, the controller 260 calculates the modulation orders for the $P_1$-order, $P_2$-order, . . . , and $P_{N_{ST}}$-order modulators 262, 264, . . . , and 266 using the gain values $P^{1/2}$ input from the basis information generation unit 172 by linear proportion and outputs the calculated modulation orders to the respective $P_1$-order, $P_2$-order, . . . , and $P_{N_{ST}}$-order modulators 262, 264, . . . , and 266. The controller 260 checks for the quantity of power allocated to each channel using the gain values $P^{1/2}$ and determines the modulation order for each channel in proportion to the quantity of power allocated to each channel. The controller 260 assigns the largest modulation order to the channel to which the greatest power is allocated and the lowest modulation order to the channel to which the lowest power is allocated.

After step 250, in step 252, $P_1$-order, $P_2$-order, . . . , and $P_{N_{ST}}$-order modulators 262, 264, . . . , and 266 perform $P_1$-order, $P_2$-order, . . . , and $P_{N_{ST}}$-order quadrature amplitude modulation (QAM) on the DPCH signals according to the modulation orders input from the controller 260 and output each modulation result to the respective first, second, . . . , and $N_{ST}$ multipliers 270, 272, . . . , and 274. Alternatively, the $P_1$-order, $P_2$-order, . . . , and $P_{N_{ST}}$-order modulators 262, 264, . . . , and 266 can modulate the DPCH signals by adaptive modulation and coding (AMC) method.

After step 252, in step 254, the first, second, . . . , and $N_{ST}$ multipliers 270, 272, . . . , and 274 multiply the modulated results from the respective $P_1$-order, $P_2$-order, . . . , and $P_{NST}$-order modulators 262, 264, . . . , and 266 and the gain values $P^{1/2}$ and output the products to the $(N_{ST}+1)^{th}$ multiplier 280.

Referring to FIG. 17, after step 240, in step 242, the $(N_{ST}+1)^{th}$ multiplier 280 multiplies the products from the first, second, . . . , and $N_{ST}$ multipliers 270, 272, . . . , and 274 and scramble/spread signal streams and outputs the products as the DPCH signals having adjusted amplitudes via an output port OUT1 to the basis vector application unit 176. Here, the scramble/spread signal streams refer to the products of multiplying scramble signal streams $c_{SC}$ and spread signal streams $c_{SP}$. Although the scramble/spread signal streams are illustrated as being previously stored in the gain adjustment unit 174, the scramble/spread signal streams may be externally input, which differs from the illustration of FIG. 12.

According to the present invention, in the gain adjustment unit 174A of FIG. 19, the $(N_{ST}+1)^{th}$ multiplier 280 may be optional. When step 242 is omitted, i.e., when the gain adjustment unit 174A does not include the $(N_{ST}+1)^{th}$ multiplier 280, the products from the first, second, . . . , and $N_{ST}$ multipliers 270, 272, . . . , and 274 are output to the basis vector application unit 176 as the DPCH signals having adjusted amplitudes.

Referring back to FIGS. 11 and 12, after step 164, in step 166, the basis vector application unit 176 applies the basis vectors Q input from the basis information generation unit 172 to the DPCH signals having the adjusted amplitudes input from the gain adjustment unit 174 and outputs those results to the addition unit 178 as spatially processed DPCH signals.

Figure 20:
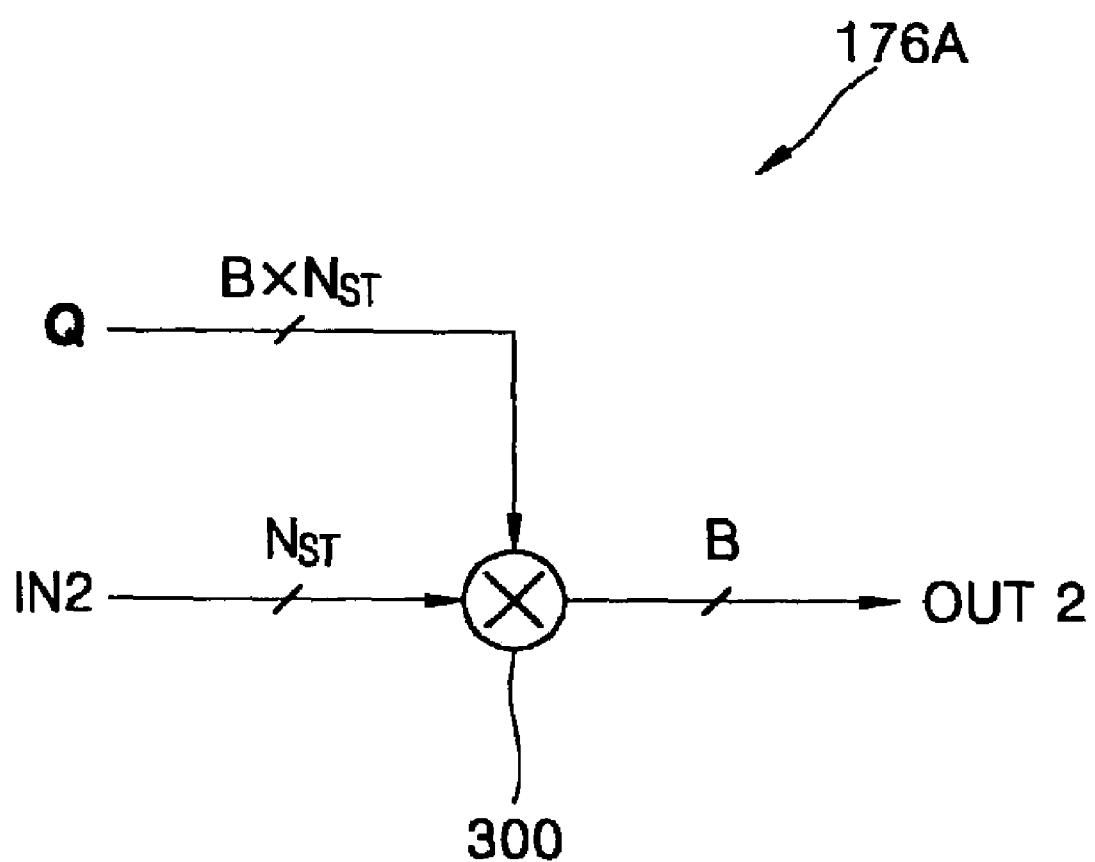
FIG. 20 is a block diagram of an embodiment of a basis vector application unit of FIG. 12.

FIG. 20 illustrates a block diagram of an embodiment 176A of the basis vector application unit 176 of FIG. 12. The embodiment 176A of the basis vector application unit 176 includes a $(N_{ST}+2)^{th}$ multiplier 300.

To perform step 166, the $(N_{ST}+2)^{th}$ multiplier 300 of the basis vector application unit 176A multiplies the $N_{ST}$DPCH signals i having the adjusted amplitudes input via an input port IN2 from the gain adjustment unit 174 by the basis vectors Q input from the basis information generation unit 172, as expressed in equation 6 below, and outputs the products via the output port OUT2 to the addition unit 178 as the spatially processed DPCH signals o:

$$o=Qi \quad (6)$$

where o and i are expressed as equations 7 and 8, respectively, below.

$$o=[o_1\ o_2\ \ldots\ o_B] \quad (7)$$

$$i=[i_1\ i_2\ \ldots\ i_{NB}] \quad (8)$$

After step 166, in step 168, the addition unit 178 adds the spatially processed DPCH signals input from the basis vector application unit 176 to PICH signals $P_1(k)$, $P_2(k)$, $P_3(k)$, . . . , and $P_B(k)$ input via an input port IN1 and transmits the added results via the antenna array 180 including transmission antennas to the first mobile station 20, the second mobile station 22, . . . , or the $X^{th}$ mobile station 24.

For step 168, the addition unit 178 may include B adders (not shown). Here, the adders add the PICH signals $P_1(k)$, $P_2(k)$, $P_3(k)$, . . . , and $P_B(k)$ to the respective spatially processed DPCH signals input from the basis vector application unit 176 and output the added results to the respective transmission antennas 182, 184, . . . , and 186 of the antenna array 180. The transmission antennas 182, 184, . . . , and 186 transmit the added results from the respective adders (not shown) of the addition unit 178 to the respective mobile stations 20, 22, . . . , and 24.

The embodiments of the base station 10 of FIG. 1 and step 32 are not limited to the above-described embodiments of the mobile station 10 and step 30 and may be applied to any mobile station provided that it is able to generate long-term information and short-term information and convert the information to a feedback signal and to transmit the feedback signal to the base station 10, as described above.

As described above, in the mobile communication apparatus including multiple transmission and reception antennas and the mobile communication method performed in the apparatus according to the present invention, the long-term information and short-term information reflecting the spatial-channel downlink characteristic are fed back from the mobile station to the base station. Therefore, the effects of interference and noise may be minimized, and transmission data throughput may be maximized, thereby minimizing fading effects.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A base station comprising:
   at least two transmission antenna; and
   first means for restoring long-term information and short-term information from a feedback signal received from a mobile station, spatially processing dedicated physical channel (DPCH) signals using basis information including a plurality of basis vectors and basis values generated from the restored long-term information and short-term information, and transmitting the results of adding pilot channel (PICH) signals to the spatially processed results to the mobile station,
   wherein the long-term information includes effective long-term eigenvectors and effective long-term eigenvalues, and the short-term information includes effective short-term eigenvectors and effective short-term eigenvalues, the effective long-term eigenvectors and effective long-term eigenvalues, and the effective short-term eigenvectors and effective short-term eigenvalues determined by using at least one predetermined threshold value.

2. The base station as claimed in claim 1, wherein the first means comprises:
   an information restoration unit which restores long-term information and short-term information from a feedback signal received from the mobile station;
   a basis information generation unit which generates basis information including a plurality of basis vectors and basis values generated from the restored long-term information and short-term information;
   a basis vector application unit which spatially processes dedicated physical channel (DPCH) signals using the basis information; and
   an adder which transmits the results of adding pilot channel (PICH) signals to the spatially processed results to the mobile station.

3. The base station as claimed in claim 2, wherein the basis information generation unit comprises:

a first multiplication portion which multiplies the restored long-term information and short-term information and outputs the product;

a second multiplication portion which calculates an autocorrelation matrix using the product from the first multiplication portion and outputs the calculated autocorrelation matrix;

a third eigenvalue decomposition and calculation portion which generates effective instantaneous eigenvectors and effective instantaneous eigenvalues using the autocorrelation matrix input from the second multiplication portion and the restored short-term information and outputs the generated effective instantaneous eigenvectors and effective instantaneous eigenvalues as the basis vectors and the basis values, respectively; and a power allocation portion calculates a power allocation ratio for channels using the basis values input from the third eigenvalue decomposition and calculation portion and signal-to-noise ratios, allocates a total power to the channels according to the calculated power allocation ratio, and outputs the allocated results as the gain values.

4. The base station as claimed in claim 3, wherein the first multiplication portion multiplies the restored long-term information and short-term information as in the following equation and outputs the product $W^H$ to the second multiplication portion:

$$W^H = Q_{LT}' \Lambda_{LT}'^{1/2} Q_{ST}' \Lambda_{ST}'^{1/2}$$

where $Q_{LT}'$ and $\Lambda_{LT}'$ denote the restored long-term information, and particularly, the restored effective long-term eigenvectors and effective long-term eigenvalues, respectively, and $Q_{ST}'$ and $\Lambda_{ST}'$ denote the restored short-term information, and particularly, the restored effective short-term eigenvectors and effective short-term eigenvalues, respectively.

5. The base station as claimed in claim 3, wherein the third eigenvalue decomposition and calculation portion comprises:

a third eigenvalue decomposer which generates instantaneous eigenvectors and instantaneous eigenvalues using the autocorrelation matrix input from the second multiplication portion by an eigenvalue decomposition method and outputs the generated instantaneous eigenvectors and instantaneous eigenvalues;

a vector count restorer which restores the number of effective short-term eigenvectors using the short-term information restored by and input from the information restoration unit and outputs the restored number of effective short-term eigenvectors; and a third selector which selects instantaneous eigenvectors from which noises have been removed, in a quantity equal to the restored number of effective short-term eigenvectors from among the instantaneous eigenvectors input from the third eigenvalue decomposer, selects instantaneous eigenvalues from which noises have been removed, in a quantity equal to the restored number of effective short-term eigenvectors from among the instantaneous eigenvalues input from the third eigenvalue decomposer, and outputs the selected instantaneous eigenvectors and instantaneous eigenvalues as the basis vectors and the basis values, respectively.

6. The base station as claimed in claim 3, wherein the power allocation portion calculates the power allocation ratio using the basis values and the signal-to-noise ratios by a water filling method.

7. The base station as claimed in claim 2, wherein the gain adjustment unit comprises:

a controller which calculates modulation orders using the gain values by linear proportion and outputs the calculated modulation orders;

$P_1$-order, $P_2$-order, . . . , and $P_{N_{ST}}$-order modulators which modulate the DPCH signals according to the modulation orders input from the controller and output each modulation result, where $N_{ST}$ means the number of effective short-term eigenvectors; and first, second, . . . , and $N_{ST}$ multipliers which multiply the modulated results from the respective $P_1$-order, $P_2$-order, . . . , and $P_{N_{ST}}$-order modulators and the gain values and outputs the products as the gain-adjusted results.

8. The base station as claimed in claim 7, wherein $P_1$-order, $P_2$-order, . . . , and $P_{N_{ST}}$-order modulators modulate the DPCH signals according to the modulation orders by quadrature amplitude modulation (QAM).

9. The base station as claimed in claim 7, wherein the gain adjustment unit further comprises a $(N_{ST}+1)^{th}$ multiplier which multiplies the products from the first, second, . . . , and $N_{ST}$ multipliers and scramble/spread signal streams and outputs the products to the basis vector application unit as the gain-adjusted results.

10. The base station as claimed in claim 2, wherein the basis vector application unit comprises a $(N_{ST}+2)^{th}$ multiplier which multiplies the gain-adjusted results input from the gain adjustment unit by the basis vectors input from the basis information generation unit and outputs the products as the spatially adjusted results.

11. A mobile station comprising:

at least one reception antenna; and first means for determining a first characteristic corresponding to a channel downlink characteristic for each of transmission and reception antennas from PICH signals transmitted from a base station, determining long-term information and short-term information reflecting the first characteristic, converting the determined long-term information and short-term information to a feedback signal, and transmitting the feedback signal to the base station, wherein the long-term information includes effective long-term eigenvectors and effective long-term eigenvalues, and the short-term information includes effective short-term eigenvectors and effective short-term eigenvalues, the effective long-term eigenvectors and effective long-term eigenvalues, and the effective short-term eigenvectors and effective short-term eigenvalues determined by using at least one predetermined threshold value.

12. The mobile station as claimed in claim 11, wherein the first means comprises:

a channel characteristic determination unit which determines a channel characteristic corresponding to the channel downlink characteristic for each of the transmission and reception antennas from the PICH signals transmitted from the base station;

a long-term information determination unit which determines the long-term information reflecting the channel characteristic;

a short-term information determination unit which determines the short-term information reflecting the channel characteristic and the long-term information;

a signal conversion unit which converts the determined long-term information and short-term information to the feedback signal, and transmits the feedback signal to the base station.

13. The mobile station as claimed in claim 12, wherein the first means further comprises:
- a high-rate feedback unit which encodes the short-term information input from the short-term information determination unit to bits and outputs the result of the bit encoding at first predetermined time intervals; and
- a low-rate feedback unit which encodes the long-term information input from the long-term information determination unit to bits and outputs the result of the bit encoding at second predetermined time intervals, and the channel characteristic determination unit determines the first characteristic from the PICH signals received from the at least two reception antenna and determines a second characteristic from the first characteristic to be provided to the long-term information determination unit and the short-term information determination unit as the channel characteristic, and the second characteristic corresponds to an instantaneous correlation of the channel downlink characteristic for each of the transmission and reception antennas, the reception antenna transmits the feedback signal to the base station, and the first predetermined time interval is shorter than the second predetermined time interval.

14. The mobile station as claimed in claim 13, wherein the first station further comprises a signal restoration unit which restores the DPCH signals from the spatially processed results received via the at least one reception antenna and outputs the restored DPCH signals.

15. The mobile station as claimed in claim 12, wherein the long-term information determination unit comprises:
- an accumulation portion which accumulates the second characteristic input from the channel characteristic determination unit and outputs the accumulated result as a third characteristic; and
- a first eigenvalue decomposition and calculation portion which generates the effective long-term eigenvectors and the effective long-term eigenvalues from the third characteristic by an eigenvalue decomposition method,
wherein the third characteristic corresponds to a long-term correlation of the channel downlink characteristic for each of the transmission and reception antennas.

16. The mobile station as claimed in claim 15, wherein the first eigenvalue decomposition and calculation portion comprises:
- a first eigenvalue decomposer which generates long-term eigenvectors and long-term eigenvalues using the third characteristic input from the accumulation portion by the eigenvalue decomposition method;
- a first vector counter which counters the number of long-term eigenvalues which are greater than a first predetermined threshold value and outputs the counted result as the number of effective long-term eigenvectors; and
- a first selector which selects long-term eigenvectors from which noises have been removed, in a quantity equal to the number of effective long-term eigenvectors from among the long-term eigenvectors input from the first eigenvalue decomposer, selects long-term eigenvalues from which noises have been removed, in a quantity equal to the number of effective long-term eigenvectors from among the long-term eigenvalues input from the first eigenvalue decomposer, and outputs the selected long-term eigenvectors and long-term eigenvalues as the effective long-term eigenvectors and the effective long-term eigenvalues, respectively, wherein the first predetermined threshold value means a noise level in the third characteristic.

17. The mobile station as claimed in claim 12, wherein the short-term information determination unit comprises:
- a short-term correlation determination portion which determines a fourth characteristic using the second characteristic input from the channel characteristic determination unit and the long-term information and outputs the fourth characteristic; and
- a second eigenvalue decomposition and calculation portion which generates the effective short-term eigenvectors and the effective short-term eigenvalues from the fourth characteristic by an eigenvalue decomposition method and outputs the generated effective short-term eigenvectors and effective short-term eigenvalues,
wherein the fourth characteristic corresponds to a short-term correlation of the channel downlink characteristic for each of the transmission and reception antennas.

18. The mobile station as claimed in claim 17, wherein the second eigenvalue decomposition and calculation portion comprises:
- a second eigenvalue decomposer which generates short-term eigenvectors and short-term eigenvalues using the fourth characteristic input from the short-term correlation determination portion by the eigenvalue decomposition method;
- a second vector counter which counters the number of short-term eigenvalues which are greater than a second predetermined threshold value and determines the number of effective short-term eigenvectors based on the counted result and the maximum number of effective short-term eigenvectors; and
- a second selector which selects short-term eigenvectors from which noises have been removed, in a quantity equal to the number of effective short-term eigenvectors from among the short-term eigenvectors input from the second eigenvalue decomposer, selects short-term eigenvalues from which noises have been removed, in a quantity equal to the number of effective short-term eigenvectors from among the short-term eigenvalues input from the second eigenvalue decomposer, and outputs the selected short-term eigenvectors and short-term eigenvalues as the effective short-term eigenvectors and the effective short-term eigenvalues, respectively, wherein the second predetermined threshold value means a noise level in the fourth characteristic.

19. A mobile communication apparatus with multiple transmission and reception antennas, the apparatus comprising a base station and a mobile station,
wherein the base station includes:
at least two transmission antennas; and
first means for restoring long-term information and short-term information from a feedback signal received from the mobile station, spatially processing dedicated physical channel (DPCH) signals using basis information including a plurality of basis vectors and basis values generated from the restored long-term information and short-term information, and transmitting the results of adding pilot channel (PICH) signals to the spatially processed results to the mobile station,
wherein the mobile station includes:
at least one reception antennas; and
second means for determining a first characteristic corresponding to the channel downlink characteristic for each of transmission and reception antennas from the PICH signals transmitted from the base station, determining long-term information and short-term information reflecting the first characteristic, converting the determined long-term information and short-term information to the feedback signal, and transmitting the feedback signal to the base station, wherein the long-term information includes effective long-term eigenvectors and effective long-term eigenvalues, and the short-term information includes effective short-term eigenvectors and effective short-term eigenvalues, the effective long-term eigenvectors and effective long-term eigenvalues, and the effective short-term eigenvectors and effective short-term eigenvalues determined by using at least one predetermined threshold value.

20. A mobile communication method performed by a base station with at least two transmission antenna, the method comprising:
(a) restoring long-term information and short-term information from a feedback signal received from a mobile station, spatially processing dedicated physical channel (DPCH) signals using basis information including a plurality of basis vectors and basis values generated from the restored long-term information and short-term information, and transmitting the results of adding pilot channel (PICH) signals to the spatially processed results to the mobile station, and wherein the long-term information includes effective long-term eigenvectors and effective long-term eigenvalues, and the short-term information includes effective short-term eigenvectors and effective short-term eigenvalues, the effective long-term eigenvectors and effective long-term eigenvalues, and the effective short-term eigenvectors and effective short-term eigenvalues determined by using at least one predetermined threshold value.

21. The method as claimed in claim 20, wherein (a) comprises:
(a1) restoring the long-term information and the short-term information from the feedback signal received via the at least one transmission antenna;
(a2) generating basis vectors and basis values as basis information from the restored long-term information and short-term information and determines gain values from the generated basis values;
(a3) adjusting the relative amplitudes of the DPCH signals using the gain values;
(a4) applying the basis vectors to the adjusted results and determining those results as the spatially processed results; and
(a5) adding the PICH signals to the spatially processed results and transmitting the added results via the at least one transmission antenna to the mobile station.

22. The method as claimed in claim 21, wherein (a2) comprises:
(a21) after (a1), multiplying the restored long-term information and short-term information to obtain a reception channel characteristic matrix;
(a22) calculating an autocorrelation matrix from the reception channel characteristic matrix;
(a23) generating effective instantaneous eigenvectors and effective instantaneous eigenvalues from the autocorrelation matrix and the restored short-term information and determining the generated effective instantaneous eigenvectors and effective instantaneous eigenvalues as the basis vectors and the basis values, respectively; and
(a24) calculating a power allocation ratio using the basis values and signal-to-noise ratios, allocating a total power to channels using the power allocation ratio, determining the allocated results as the gain values, and proceeding to (a3).

23. The method as claimed in claim 21, wherein (a23) comprises:
after (a22), generating instantaneous eigenvectors and instantaneous eigenvalues from the autocorrelation matrix by an eigenvalue decomposition method;
restoring the number of effective short-term eigenvectors from the restored short-term information; and
selecting instantaneous eigenvectors from which noises have been removed, in a quantity equal to the restored number of effective short-term eigenvectors from among the generated instantaneous eigenvectors and instantaneous eigenvalues from which noises have been removed, in a quantity equal to the restored number of effective short-term eigenvectors from among the generated instantaneous eigenvalues, and outputting the selected instantaneous eigenvectors and instantaneous eigenvalues as the basis vectors and the basis values, respectively.

24. The method as claimed in claim 21, wherein (a3) comprises (a31) adjusting modulation orders, coding rate, and amplitude of the DPCH signals using the gain values after (a2) and proceeding to (a4).

25. The method as claimed in claim 24, wherein (a3) comprises multiplying the adjusted results in (a31) and scramble/spread signal streams and proceeding to (a4).

26. The method as claimed in claim 24, wherein (a31) comprises:
after (a2), obtained the modulation orders using the gain values by linear proportion; and
modulating the DPCH signals according to the modulation orders; and
multiplying the modulated results and the gain values and proceeding to (a4).

27. The method as claimed in claim 21, wherein (a4) comprises multiplying the adjusted results from (a3) and the basis vectors, determining the products as the spatially processed results, and proceeding to (a5).

28. A mobile communication method performed by a mobile station with at least one reception antenna, the method comprising:
(a) determining the first characteristic from PICH signals transmitted from a base station, determining long-term information and the short-term information based on the first characteristic, converting the long-term information and short-term information to a feedback signal, and transmitting the feedback signal to the base station,
wherein the long-term information includes effective long-term eigenvectors and effective long-term eigenvalues, and the short-term information includes effective short-term eigenvectors and effective short-term eigenvalues, the effective long-term eigenvectors and effective long-term eigenvalues, and the effective short-term eigenvectors and effective short-term eigenvalues determined by using at least one predetermined threshold value.

29. The method as claimed in claim 28, wherein (a) comprises:
(a1) determining the first characteristic from the PICH signals received via the at least one reception antenna and generating a second characteristic using the determined first characteristic;
(a2) determining the effective long-term eigenvectors and the effective long-term eigenvalues using the second characteristic;

(a3) determining the effective short-term eigenvectors and the effective short-term eigenvalues from the second characteristic and the long-term information; and (a4) converting the long-term information and short-term information determined in (a2) and (a3), respectively, to the feedback signal and transmitting the converted feedback signal via the at least one reception antenna to the base station, wherein the second characteristic corresponds to an instantaneous correlation of the channel downlink characteristic for each of the transmission and reception antennas.

30. The method as claimed in claim 29, wherein (a) further comprises restoring the PICH signals from the spatially processed results received via the at least one reception antenna.

31. The method as claimed in claim 29, wherein (a2) comprises:

(a21) after (a1), accumulating the second characteristic and determining the accumulated result as a third characteristic; and (a22) generating the effective long-term eigenvectors and the effective long-term eigenvalues from the third characteristic by an eigenvalue decomposition method and proceeding to (a3), wherein the third characteristic corresponds to a long-term correlation of the channel downlink characteristic for each of the transmission and reception antennas.

32. The method as claimed in claim 31, wherein (a22) comprises:

after (a21), generating long-term eigenvectors and long-term eigenvalues from the third characteristic by the eigenvalue decomposition method;

counting the number of long-term eigenvalues which are greater than a first predetermined threshold value and determining the counted result as the number of effective long-term eigenvectors; and selecting long-term eigenvectors from which noises have been removed, in a quantity equal to the number of effective long-term eigenvectors from among the generated long-term eigenvectors and long-term eigenvalues from which noises have been removed, in a quantity equal to the number of effective long-term eigenvectors from among the generated long-term eigenvalues, and determining the selected long-term eigenvectors and effective long-term eigenvalues as the effective long-term eigenvectors and the effective long-term eigenvalues, respectively, and proceeding to (a3), wherein the first predetermined threshold value means a noise level in the third characteristic.

33. The method as claimed in claim 29, wherein (a3) comprises:

(a31) after (a2), determining a fourth characteristic from the second characteristic and the long-term information; and (a32) generating the effective short-term eigenvectors and the effective short-term eigenvalues from the fourth characteristic by an eigenvalue decomposition method and proceeding to (a4), wherein the fourth characteristics corresponds to a short-term correlation of the channel downlink characteristic for each of the transmission and reception antennas.

34. The method as claimed in claim 33, wherein (a32) comprises:

after (a31), generating short-term eigenvectors and short-term eigenvalues from the fourth characteristic by the eigenvalue decomposition method;

counting the number of short-term eigenvalues which are greater than a second predetermined threshold value and determining the number of effective short-term eigenvectors using the counted result and a predetermined maximum number of effective short-term eigenvectors; and selecting short-term eigenvectors from which noises have been removed, in a quantity equal to the number of effective short-term eigenvectors from among the generated short-term eigenvectors and short-term eigenvalues from which noises have been removed, in a quantity equal to the number of effective short-term eigenvectors from among the generated short-term eigenvalues, and determining the selected short-term eigenvectors and effective short-term eigenvalues as the effective short-term eigenvectors and the effective short-term eigenvalues, respectively, wherein the second predetermined threshold value means a noise level in the fourth characteristic.

* * * * *